US009563900B1

(12) United States Patent
Guo et al.

(10) Patent No.: US 9,563,900 B1
(45) Date of Patent: Feb. 7, 2017

(54) METHOD, APPARATUS, AND COMPUTER PROGRAM PRODUCT FOR CONSUMER TRACKING

(71) Applicant: Groupon, Inc., Chicago, IL (US)

(72) Inventors: Jiaqi Guo, Chicago, IL (US); Michael Elizarov, Chicago, IL (US); Jim Breen, Chicago, IL (US); Selvam Velmurugan, Chicago, IL (US)

(73) Assignee: Groupon, Inc., Chicago, IL (US)

( * ) Notice: Subject to any disclaimer, the term of this patent is extended or adjusted under 35 U.S.C. 154(b) by 552 days.

(21) Appl. No.: 14/039,473

(22) Filed: Sep. 27, 2013

(51) Int. Cl.
*H04L 29/06* (2006.01)
*G06Q 30/02* (2012.01)

(52) U.S. Cl.
CPC ................ *G06Q 30/0201* (2013.01)

(58) Field of Classification Search
CPC .............................. G06Q 30/0201
USPC ...................................... 713/150
See application file for complete search history.

(56) References Cited

U.S. PATENT DOCUMENTS

| 8,355,948 | B2 | 1/2013 | Mason | |
|---|---|---|---|---|
| 8,893,009 | B2* | 11/2014 | Raleigh | H04M 15/00 455/557 |
| 2010/0299251 | A1* | 11/2010 | Thomas | G06Q 20/10 705/39 |
| 2012/0271725 | A1* | 10/2012 | Cheng | H04W 4/008 705/21 |
| 2013/0073388 | A1* | 3/2013 | Heath | G06Q 50/01 705/14.53 |
| 2014/0180792 | A1* | 6/2014 | Zaheer | G06Q 30/0244 705/14.43 |

FOREIGN PATENT DOCUMENTS

CN            0101193089 A *  6/2008     ............. H04L 29/02

OTHER PUBLICATIONS

U.S. Appl. No. 13/411,502, filed Mar. 2, 2012; In re: O'Brien et al., entitled *Relevance System for Consumer Deals*.
U.S. Appl. No. 13/829,581, filed Mar. 14, 2013; In re: Aggarwal et al., entitled *Promotion Offering System*.

* cited by examiner

*Primary Examiner* — Morshed Mehedi
*Assistant Examiner* — Khalil Naghdali
(74) *Attorney, Agent, or Firm* — Alston & Bird LLP

(57) ABSTRACT

Provided herein are systems, methods and computer readable media for consumer monitor and tracking. An example method may include receiving client device ID and client device profile data, comparing client device ID and client device profile data to a plurality of known client device versions, generating an updated known client device version in an instance in which the client device ID correlates to at least one of the plurality of known client device versions and the client device profile data does not correlate to the at least one of the plurality of known client device versions and generating a new known client device version in an instance in which the client device ID does not correlate to at least one of the plurality of known client device versions.

27 Claims, 10 Drawing Sheets

METHOD, APPARATUS, AND COMPUTER PROGRAM PRODUCT FOR CONSUMER TRACKING

FIELD

Embodiments of the invention relate, generally, to tracking, storing and retrieving consumer related data.

BACKGROUND

Various technologies and techniques exist for monitoring or tracking user behavior based on mobile application and web browser activity. Applicant has identified a variety of problems associated with such conventional technologies and techniques. Through applied effort, ingenuity, and innovation, Applicant has identified various solutions to these problems that are embodied by various embodiments of the invention as herein described.

BRIEF SUMMARY

In general, embodiments of the present invention provided herein include systems, methods and computer readable media for the tracking, storing and retrieving consumer related data in order to monitor or identify mobile application and web browser activity of a consumer.

In some embodiments, a method may be provided, the method comprising receiving client device ID and client device profile data, comparing client device ID and client device profile data to a plurality of known client device versions, generating an updated known client device version in an instance in which the client device ID correlates to at least one of the plurality of known client device versions and the client device profile data does not correlate to the at least one of the plurality of known client device versions, and generating a new known client device version in an instance in which the client device ID does not correlate to at least one of the plurality of known client device versions.

In some embodiments, the method may further comprise comparing client device ID to any known client device sessions, generating an updated known client device session in an instance in which the client device ID correlates to any known client device sessions, and generating a new known client device session in an instance in which the client device ID does not correlate to any known client device sessions. In some embodiments, the method may further comprise generating the updated known client device session in an instance in which the client device ID correlates to one of the any known client device sessions and a timestamp associated with the one of the any known client device sessions satisfies a predetermined threshold.

In some embodiments, the client device ID and client device profile data are compared to a latest known client device version, and an updated known client device version is generated in an instance in which the client device ID correlates to latest known client device version and the client device profile data does not correlate to the latest known client device version, and a new known client device version is generated in an instance in which the client device ID does not correlate to latest known client device version. In some embodiments, the client device ID is compared to a last known client device session, and an updated known client device session is generated in an instance in which the client device ID correlates to the last known client device session, and a new known client device session is generated in an instance in which the client device ID does not correlate to last known client device session.

In some embodiments, the method may further comprise receiving a consumer ID, and correlating the updated known client device session or the new known client device session to a consumer session reference based on the consumer ID. In some embodiments, the method may further comprise terminating the updated known client device session or the new known client device session, and generating a consumer attached client device session upon receiving the consumer ID. In some embodiments, the method may further comprise receiving a logout request, terminating the consumer attached client device session, and generating a consumer detached client device session. In some embodiments, the client device profile data comprises at least one of browser type, internet protocol (IP) address, or device model. In some embodiments, the method may further comprise generating a new timestamp based on a current time for association with the updated known client device session. In some embodiments, the method may further comprise receiving session data, and associating the session specific data to the updated known client device session or the new known client device session.

In some embodiments, a method may be provided, the method comprising receiving a client device ID and client device profile data, determining consumer attached session data associated with the client device ID, receiving session data, determining a weighted correlation value by comparing the session data to the consumer attached session data, and updating consumer attached session data if the weighted correlation value satisfies a predetermined threshold. In some embodiments, the weighted correlation value is based on one or more page view indications, one or more page view duration indications, aggregate page view information and aggregate page view duration information.

In some embodiments, the method may further comprise comparing client device ID to any known client device sessions, generating an updated known client device session in an instance in which the client device ID correlates to any known client device sessions, and generating a new known client device session in an instance in which the client device ID does not correlate to any known client device sessions. In some embodiments, the method may further comprise generating the updated known client device session in an instance in which the client device ID correlates to one of the any known client device sessions and a timestamp associated with the one of the any known client device sessions satisfies a predetermined threshold. In some embodiments, the client device ID is compared to a last known client device session, and an updated known client device session is generated in an instance in which the client device ID correlates to the last known client device session, and a new known client device session is generated in an instance in which the client device ID does not correlate to last known client device session.

In some embodiments, the method may further comprise receiving a consumer ID, correlating the updated known client device session or the new known client device session to a consumer session reference based on the consumer ID, terminating the updated known client device session or the new known client device session, generating a consumer attached client device session upon receiving the consumer ID. In some embodiments, the method may further comprise receiving a logout request, terminating the consumer attached client device session, and generating a consumer detached client device session.

In some embodiments, a computer program product may be provided comprising at least one computer-readable storage medium having computer-executable program code instructions stored therein, the computer-executable program code instructions comprising program code instructions for receiving client device ID and client device profile data, comparing client device ID and client device profile data to a plurality of known client device versions, generating an updated known client device version in an instance in which the client device ID correlates to at least one of the plurality of known client device versions and the client device profile data does not correlate to the at least one of the plurality of known client device versions, and generating a new known client device version in an instance in which the client device ID does not correlate to at least one of the plurality of known client device versions.

In some embodiments, the computer-executable program code instructions further comprise program code instructions for comparing client device ID to any known client device sessions, generating an updated known client device session in an instance in which the client device ID correlates to any known client device sessions, and generating a new known client device session in an instance in which the client device ID does not correlate to any known client device sessions. In some embodiments, the computer-executable program code instructions further comprise program code instructions for generating the updated known client device session in an instance in which the client device ID correlates to one of the any known client device sessions and a timestamp associated with the one of the any known client device sessions satisfies a predetermined threshold.

In some embodiments, the client device ID and client device profile data is compared to a latest known client device version, and an updated known client device version is generated in an instance in which the client device ID correlates to latest known client device version and the client device profile data does not correlate to the latest known client device version, and a new known client device version is generated in an instance in which the client device ID does not correlate to latest known client device version. In some embodiments, the client device ID is compared to a last known client device session, and an updated known client device session is generated in an instance in which the client device ID correlates to the last known client device session, and a new known client device session is generated in an instance in which the client device ID does not correlate to last known client device session.

In some embodiments, the computer-executable program code instructions further comprise program code instructions for receiving a consumer ID, correlating the updated known client device session or the new known client device session to a consumer session reference based on the consumer ID. In some embodiments, the computer-executable program code instructions further comprise program code instructions for terminating the updated known client device session or the new known client device session, and generating a consumer attached client device session upon receiving the consumer ID.

In some embodiments, the computer-executable program code instructions further comprise program code instructions for receiving a logout request, terminating the consumer attached client device session, and generating a consumer detached client device session. In some embodiments, the client device profile data comprises at least one of browser type, internet protocol (IP) address, or device model. In some embodiments, the computer-executable program code instructions further comprise program code instructions for generating a new timestamp based on a current time for association with the updated known client device session. In some embodiments, the computer-executable program code instructions further comprise program code instructions for receiving session data, and associating the session specific data to the updated known client device session or the new known client device session.

In some embodiments, a computer program product may be provided comprising at least one computer-readable storage medium having computer-executable program code instructions stored therein, the computer-executable program code instructions comprising program code instructions for receiving a client device ID and client device profile data, determining consumer attached session data associated with the client device ID, receiving session data, determining a weighted correlation value by comparing the session data to the consumer attached session data, and updating consumer attached session data if the weighted correlation value satisfies a predetermined threshold.

In some embodiments, the weighted correlation value is based on one or more page view indications, one or more page view duration indications, aggregate page view information and aggregate page view duration information. In some embodiments, the computer-executable program code instructions further comprise program code instructions for comparing client device ID to any known client device sessions, generating an updated known client device session in an instance in which the client device ID correlates to any known client device sessions, and generating a new known client device session in an instance in which the client device ID does not correlate to any known client device sessions. In some embodiments, the computer-executable program code instructions further comprise program code instructions for generating the updated known client device session in an instance in which the client device ID correlates to one of the any known client device sessions and a timestamp associated with the one of the any known client device sessions satisfies a predetermined threshold.

In some embodiments, the client device ID is compared to a last known client device session, an updated known client device session is generated in an instance in which the client device ID correlates to the last known client device session, and a new known client device session is generated in an instance in which the client device ID does not correlate to last known client device session. In some embodiments, the computer-executable program code instructions further comprise program code instructions for receiving a consumer ID, correlating the updated known client device session or the new known client device session to a consumer session reference based on the consumer ID, terminating the updated known client device session or the new known client device session, and generating a consumer attached client device session upon receiving the consumer ID. In some embodiments, the computer-executable program code instructions further comprise program code instructions for receiving a logout request, terminating the consumer attached client device session, and generating a consumer detached client device session.

In some embodiments, an apparatus may be provided comprising a processor and a memory having computer code stored therein, the computer code configured, when executed by the processor, to cause the apparatus to receive client device ID and client device profile data, compare client device ID and client device profile data to a plurality of known client device versions, generate an updated known client device version in an instance in which the client device ID correlates to at least one of the plurality of known client device versions and the client device profile data does not correlate to the at least one of the plurality of known client device versions, and generate a new known client device version in an instance in which the client device ID does not correlate to at least one of the plurality of known client device versions.

In some embodiments, the computer code is further configured, when executed by the processor, to cause the apparatus to compare client device ID to any known client device sessions, generate an updated known client device session in an instance in which the client device ID correlates to any known client device sessions, and generate a new known client device session in an instance in which the client device ID does not correlate to any known client device sessions. In some embodiments, the computer code is further configured, when executed by the processor, to cause the apparatus to generate the updated known client device session in an instance in which the client device ID correlates to one of the any known client device sessions and a timestamp associated with the one of the any known client device sessions satisfies a predetermined threshold.

In some embodiments, the client device ID and client device profile data is compared to a latest known client device version, and an updated known client device version is generated in an instance in which the client device ID correlates to latest known client device version and the client device profile data does not correlate to the latest known client device version, and a new known client device version is generated in an instance in which the client device ID does not correlate to latest known client device version. In some embodiments, the client device ID is compared to a last known client device session, and an updated known client device session is generated in an instance in which the client device ID correlates to the last known client device session, and a new known client device session is generated in an instance in which the client device ID does not correlate to last known client device session.

In some embodiments, the computer code is further configured, when executed by the processor, to cause the apparatus to receive a consumer ID, correlate the updated known client device session or the new known client device session to a consumer session reference based on the consumer ID. In some embodiments, the computer code is further configured, when executed by the processor, to cause the apparatus to terminate the updated known client device session or the new known client device session, and generate a consumer attached client device session upon receive the consumer ID. In some embodiments, the computer code is further configured, when executed by the processor, to cause the apparatus to receive a logout request, terminate the consumer attached client device session, and generate a consumer detached client device session.

In some embodiments, the client device profile data comprises at least one of browser type, internet protocol (IP) address, or device model. In some embodiments, the computer-executable program code instructions further comprise program code instructions for generating a new timestamp based on a current time for association with the updated known client device session. In some embodiments the computer code is further configured, when executed by the processor, to cause the apparatus to receive session data, and associate the session specific data to the updated known client device session or the new known client device session.

In some embodiments, an apparatus may be provided comprising a processor and a memory have computer code stored therein, the computer code configured, when executed by the processor, to cause the apparatus to receive a client device ID and client device profile data, determine consumer attached session data associated with the client device ID, receive session data, determine a weighted correlation value by comparing the session data to the consumer attached session data, and update consumer attached session data if the weighted correlation value satisfies a predetermined threshold. In some embodiments, the weighted correlation value is based on one or more page view indications, one or more page view duration indications, aggregate page view information and aggregate page view duration information. In some embodiments, the computer code is further configured, when executed by the processor, to cause the apparatus to compare client device ID to any known client device sessions, generate an updated known client device session in an instance in which the client device ID correlates to any known client device sessions, and generate a new known client device session in an instance in which the client device ID does not correlate to any known client device sessions.

In some embodiments, the computer code is further configured, when executed by the processor, to cause the apparatus to generate the updated known client device session in an instance in which the client device ID correlates to one of the any known client device sessions and a timestamp associated with the one of the any known client device sessions satisfies a predetermined threshold. In some embodiments, the client device ID is compared to a last known client device session, an updated known client device session is generated in an instance in which the client device ID correlates to the last known client device session, and a new known client device session is generated in an instance in which the client device ID does not correlate to last known client device session.

In some embodiments, the computer code is further configured, when executed by the processor, to cause the apparatus to receive a consumer ID, correlate the updated known client device session or the new known client device session to a consumer session reference based on the consumer ID, terminate the updated known client device session or the new known client device session, and generate a consumer attached client device session upon receiving the consumer ID. In some embodiments, the computer code is further configured, when executed by the processor, to cause the apparatus to receive a logout request, terminate the consumer attached client device session, and generate a consumer detached client device session.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
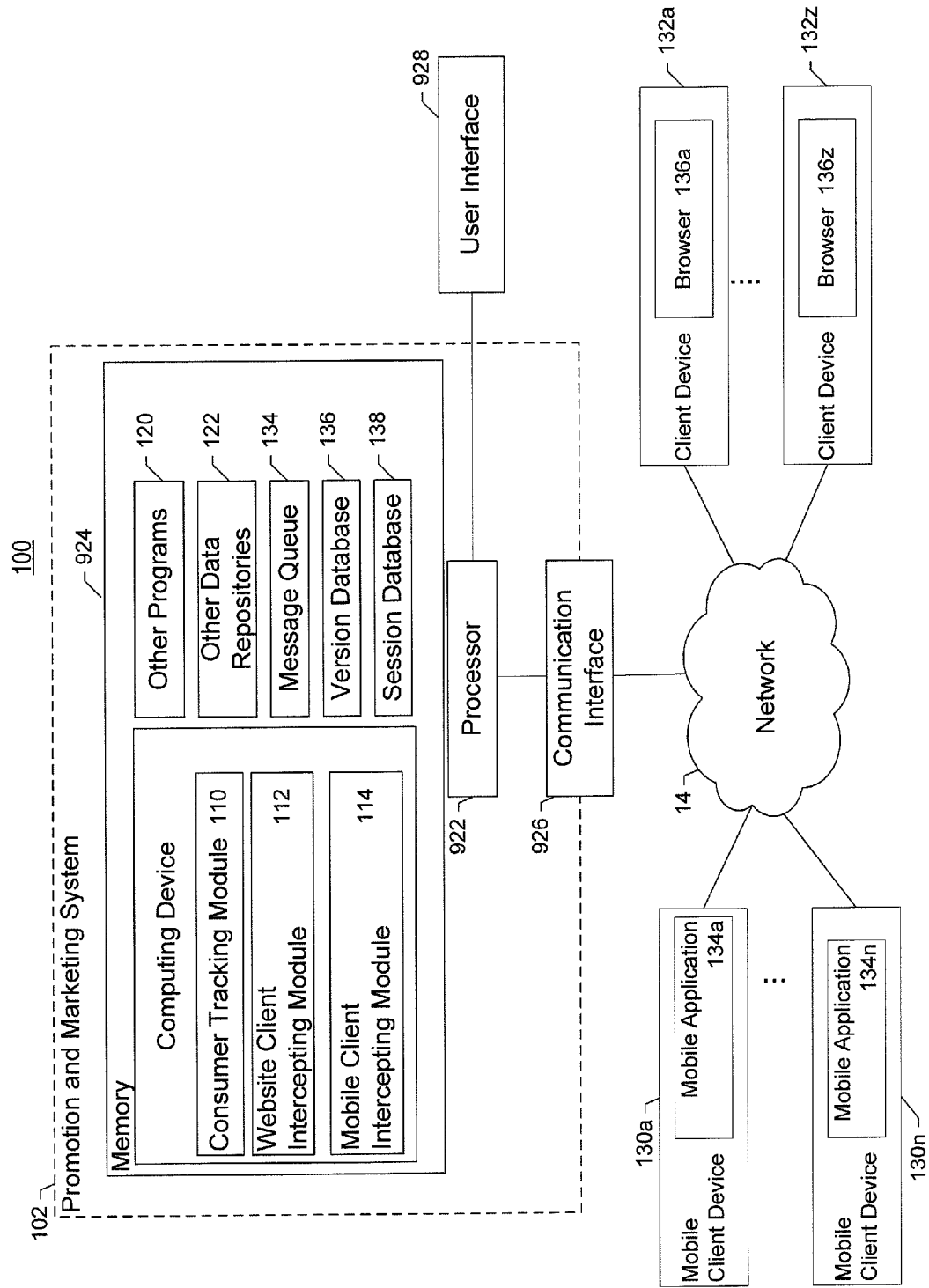
FIG. 1 is block diagram of a consumer tracking system that is configured to track, store, and access consumer behavior, in accordance with an example embodiment.

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

DEFINITIONS

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

In some embodiments, a host system may be implemented as a promotional system to offer promotions to a consumer. A promotion and marketing service may utilize a host system, such as a promotional system, to offer such promotions. A "promotion and marketing service" may provide promotion and/or marketing services on behalf of one or more providers (e.g., one or more merchants, retailers, etc.) that are offering one or more instruments that are redeemable for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

A "promotion" may be a deal purchased by a consumer from a promotional system, and may be considered an agreement for a particular provider to provide a service or good (e.g., a discounted service or good) to the consumer. A promotion may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion may be a deal offer whereby a running shoes company or intermediary (e.g., promotion provider) offers $50 of value toward the purchase of running shoes in exchange for $25. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, and using the running shoes company promotion as an example, the accepted value is $25 and the promotional value is $50. In this example, the residual value may be equal to the accepted value.

An "instrument" associated with a promotion may include, but is not limited to, any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as an accepted value, a promotional value and/or a residual value. For example, using the aforementioned running shoes company as the example provider, an electronic indication in a mobile application that shows $50 of value to spend at the running shoes company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

A "provider" may be considered a merchant, retailer, or other provider of goods or services that offers a promotion, as agreed upon with the promotion and marketing service affiliated with the promotional system. A provider may include, but is not limited to, a merchant, business owner, consigner, shopkeeper, tradesperson, vender, operator, entrepreneur, agent, dealer, retailer, organization or the like that is in the business of a providing a good, service or experience to a consumer, facilitating the provision of a good, service or experience to a consumer and/or otherwise operating in the stream of commerce. For example, a provider may the form of a running shoes company that sells attire that is generally used by a person who runs or participates in athletic activities.

An "impression" may be considered a communication advertising an offer to purchase a promotion from a promotional system. An impression may include a communication, a display, or other perceived indication, such as a flyer, print media, e-mail, text message, application alert, mobile applications, other type of electronic interface or distribution channel and/or the like, of one or more promotions. For example, and using the aforementioned running company as the example provider, an e-mail communication sent to consumers that indicates the availability of a $25 for $50 toward running shoes promotion.

Impressions are therefore provided to "consumers," including, but not limited to, a client, customer, purchaser, shopper, user of the promotional system or the like who may be in the position to or does exchange value for one or more instruments under the terms defined by the one or promotions. For example, and using the aforementioned running shoes company as the example provider, an individual who is interested in purchasing running shoes.

Analyzing "explicit data," such as user-provided data in user profiles, preferences, and/or promotion purchase history, for example, may allow the promotional system to better target promotion types or impressions to consumers. A consumer may be more likely to purchase a promotion if the impression advertising the promotion is of interest to the consumer than if the associated promotion was selected at random.

Additionally or alternatively, accessing "implicit data," data that may be user-provided for a purpose other than for use on the promotional system and/or detected by the promotional system, may allow a promotional system to gather information on consumer behaviors, preferences and preferred locations. Example implicit data may include data indicative of a consumer's browsing history, detected location, or the consumer's social network profile information, for example.

A "client device" may be a device or module operable to access a website (e.g., perhaps using a web browser) or execute a mobile application, such as a laptop, mobile phone, tablet, personal computer, or the like. A client device may place a request, such as in response to a consumer activity facilitated by a user interface such as, without limitation, clicking a link, selecting particular text or image data, and/or inputting or entering data. The client device may be identified by a client device ID. A "client device ID" may be a data entity generated by a host system that identifies a client device. "Client device ID" may include and/or be a function of one or more "tokens." Tokens being information or data for identifying a client device such as, for example, a "tracking" cookie for a browser operated device, a native device ID, and/or a hardware/device serial number. In various embodiments, tokens may include immutable data. For example, tokens may include one or more of a serial number, build number, batch number, mac address and model name, etc. In some embodiments, a host system may identify each of one or more tokens available and generate a client device ID based on the one or more tokens. In some embodiments, the generation of the client device ID by the host system is a probabilistic determination of whether captured information (i.e., information received from a client device) identifies or is likely to identify a particular client device. Client device ID may be used generally to refer to data identifying a client device.

Each client device may comprise or generate client device profile data, which may then be stored as a client device profile. In various embodiments, "client device profile data" may include mutable data associated with the client device (e.g., one or more of a model number, a model name, a model version, operating system information, such as name and version, a kernel version, a build number, safety information, security information, system information, network information), web browser user agent, country and language, device OS name and version, carrier, etc.

A "version" may be a data entity generated by a host system that identifies a particular instance of a client device. A version may include a client device ID and client device profile data including, for example and without limitation, client device hardware information, client software information, or one or more of the client device profile data identified above. For example, a version may also comprise one or more of a model number, a model name, a model version, operating system information, such as name and version, a kernel version, a build number, safety information, security information, system information, network information, etc. A host system may further identify client devices with increasing version numbers, where each version may comprise client device profile data unique to that particular version.

A "session" may be a data entity generated by a host system that captures, identifies, or embodies an instance or a period of consumer activity associated with a website or mobile application. A session may begin when a consumer accesses a website or mobile application and may end when the consumer leaves the website or quits the mobile application. A session may be identified by a "session ID." A "session ID" may be a data entity generated by a host system that captures, identifies, or embodies information such as a one or more of a client device ID, a client device version number, data indicative of a period of latest consumer activity, or one or more timestamps (e.g., time of creation, login, logout, or the like).

In some embodiments, a host system may be configured to determine when to close a session. For example, as a consumer continues to navigate a website or mobile application, a host system may capture indications of consumer activity and may continue to do so for the period of consumer activity. A "session timestamp", which is a data entity that may be included in a session ID for indicating a time of last consumer activity, may be updated at each instance of consumer activity. However, when, for example, a consumer stops navigating the website or mobile application, the host system may identify no consumer activity. If a consumer returns to access a website or mobile application and the host system may then determines, based on looking at the session timestamp, whether the consumer has returned within a time period identified by the predetermined "session time" (e.g., 30 minutes). A "session time" may be a predetermined time of inactivity in which the host system may determine that subsequent consumer activity is part of the originally identified session. Here, for example, if the host system determines that the subsequent consumer activity is within the session time, the host system determines that the consumer activity is part of the originally identified session and that session may not be closed. However, if the consumer returns to access the website or open the mobile application after the time period identified by the predetermined session time, the host system may determine that such return consumer activity is part of a subsequent session. In some embodiments, a new session is generated and the previous session is closed. In some embodiments, a predetermined session time may be one factor in a probabilistic determination of session identification. For example, in addition to utilizing session time, a host system may capture information related to session identification. Then, based on which information is captured and when the information is captured, the host system may determine whether to identify the information in a current session or start a new session. In some embodiments, the host system may be configured to factor associated confidence levels associated with the captured information into a probabilistic determination of whether the information should be identified as part of the current session or whether a new session should be created.

The term "session data" refers to any data generated, obtained, or otherwise associated with a session by a host system. For example, and without limitation, session data may comprise one or more page view indications indicating which pages of a website or mobile application a consumer visits during a session. Session data may also indicate how long a consumer dwelled at a website page between clicks, calls, and/or requests. Session data may also comprise aggregated page view information and aggregated page view duration information. Session data may further include download indications, scroll indications, mouse hover indications, idle time indications or the like. Session data may also include implicit data derived from the page view indications, page view duration indications, aggregate page view information, aggregate page view duration information, download indications, scroll indications, idle indications, or the like. For example, in various embodiments, session data may include explicit data such as one or more email addresses or subscription preferences and/or session data may include consumer preference information inferred based on analyzing or modeling session data. For example, session data may include one or more engagement scores calculated based on a consumer's likelihood of purchasing a promotion, clicking a link or performing some other action, based on session data and optionally, calculated, determined, and/or displayed by category, sub-category, location, hyper-location, price ranges or the like.

A "consumer ID" may include information or data for identifying a consumer such as, for example, a username, password, user ID, login name, sign-in name, unique name, email address, pin number, account number, identification number, and the like.

A "consumer attached session" refers to a session that is associated with a consumer ID. For example, a consumer attached session may be created when a consumer logs into a particular website or mobile application.

A "consumer attached client device session" refers to a session that is associated with a consumer ID and a client device ID. For example, a consumer attached client device session may be created when a consumer logs in to a particular website or mobile application using a particular client device.

A "consumer detached client device session" refers to a session that is associated with a client device ID but not with a consumer ID. For example, a consumer attached client device session may be created when a consumer accesses, but does not log into, a website or mobile application or perhaps when a consumer logs out from a website or mobile application but nonetheless continues to access the website or mobile application.

The term "consumer attached session data" refers to session data that is associated with one or more consumer IDs regardless of whether such session data is also associated with one or more particular client device IDs. Consumer attached session data may be, in some instances, indicative of activity monitored during a single session. In some embodiments, however, consumer attached session data may be indicative of aggregated, weighted, normalized and/or averaged data indicative of activity from one or more sessions.

The term "weighted correlation value" is a percentage, ratio, or other value indicative of a correlation or correlation strength that may be identified between an entity or set of consumer attached session data and session data.

A "device stage" may be a data entity generated by a host system that identifies a state, status, or other particular characteristics of a client device upon its use to access the promotion and marketing service. An "unrecognized" device stage may identify a particular client device, with which a consumer may be accessing, for the first time, a mobile application or a home page associated with the marketing and promotion system. Following the initial identification, and as discussed in more detail below, a client device may be identified in "recognized" device stage, meaning the host system may identify the client device as having accessed, at a previous time, the mobile application or home page associated with the marketing and promotion system.

A "recognized" device stage may be "unauthenticated" or "authenticated." The host system may identify as "authenticated" a client device through which a consumer has subscribed or logged in but through which has not done anything to re-authenticate his account for predefined period of time. In some embodiments, when a "recognized" and "authenticated" device stage is identified, the promotion and marketing system may display recommendations for an inferred consumer. The host system may identify as "unauthenticated" a client device through which a consumer has subscribed or logged in and then subsequently logged out. In an instance in which a consumer is accessing the mobile application or webpage without being logged in, and based on inferential or implicit data, the host system may associate presently generated session data with consumer attached session data and the device stage may be considered as "consolidated/reconciled."

BRIEF OVERVIEW

The methods, apparatus and computer program products described herein are operable for the identifying, tracking, storing and retrieving of consumer related data in order to monitor or identify mobile application and web browser activity of a consumer. Such mobile application and web browser activity may be used by a host system (e.g., a promotion and marketing system) to identify consumer interests, preferences, and make other inferential determinations.

The host system may be configured such that particular promotions may be offered to consumers based on relevance determinations. In each of U.S. patent application Ser. No. 13/411,502, filed Mar. 2, 2012, titled "RELEVANCE SYSTEM FOR CONSUMER DEALS", U.S. patent application Ser. No. 13/829,581 entitled "Promotion Offering System" and filed on Mar. 14, 2013, U.S. patent application Ser. No. 12/776,028, now U.S. Pat. No. 8,355,948, titled "SYSTEM AND METHODS FOR DISCOUNT RETAILING" filed on May 7, 2010, each of which is hereby incorporated by reference, algorithms are provided for matching consumers to relevant promotions.

As will be apparent to one of ordinary skill in the art in view of this disclosure, consumers may access content provided by a host system in a variety of ways. For example, a consumer may use a web browser to visit a website operated by a promotion and marketing service and hosted via the host system. In addition, the consumer may use a mobile application (e.g., a software application or "app") to access promotion provider content hosted by the host system.

Various embodiments of the present invention are configured to allow the host system, and therefore the promotion and marketing service, to identify, track, and store indications of web browser and mobile application activity of a consumer. Some embodiments do so in a manner that utilizes as much captured information (e.g., tokens) as possible (e.g., both mutable and immutable data) to identify a consumer and/or a client device.

Various embodiments of the present invention are further configured to handle two example consumer access scenarios that prove difficult for conventional consumer tracking systems. The first scenario is referred to herein as a "multi-user single device" scenario and involves a single client device that is used by multiple consumers. For example, a family tablet computer or laptop may be used by a wife and her husband. Additionally, a public computer used in an Internet café may be used by hundreds of different consumers.

The second scenario referred to herein is the "single user multiple device" scenario, which involves a single consumer using multiple client devices. For example, a single consumer may use her family tablet, her smartphone, her office computer, and an Internet café computer to access content of a host system.

As described in greater detail below, various embodiments of the invention provide solutions for each of the above scenarios that move consumer specific data away from the client device and instead provide a centralized system for tracking consumer data that is scalable across multiple differing types of client devices. Such embodiments are further configured to track consumer data generated both by web browser and mobile application consumer activity.

In some embodiments, the host system may achieve the above benefits by, for example, determining whether a particular client device being used by a consumer has previously been used to visit a web page or execute a mobile application before. A consumer tracking module of the host system may do this by identifying a client device ID and client device profile data and by searching for known client device versions that may be stored in, for example, a version database. Depending on whether the client device ID and client device profile data correlate to any known device versions, an updated known client device version or a new known client device version may be generated.

Example System Architecture

FIG. 1 is a block diagram showing an exemplary consumer tracking system 100 for identifying, tracking, storing, and retrieving consumer related data (e.g., client device ID, client device profile data, session data) across different device stages (e.g., unrecognized, recognized, subscribed, authenticated, consolidated/reconciled) and/or multiple client devices (e.g., client devices supporting browser applications, mobile applications, and/or both).

The depicted system 100 is configured to include a host system 102 disposed in communication with various client devices via a network 14. The depicted host system 102 comprises a consumer tracking module 110, a website client intercepting module 112, and a mobile client intercepting module 114. In some embodiments, the host system 102 may be configured to include one or more of a message queue 134 for allowing intermittent transmission of consumer related data to the host system 102, a version database 136 for storing version related information, and a session database 138 for storing session data. As such, the system may be configured to track consumer related data while storing relatively little information to the various client devices.

In some configurations, to avoid introducing unnecessary latency or reducing availability to customer facing services, an application program interface (API) may be provided asynchronously, which allows a website or mobile application service to interact with the host system 102 via the message queue 134 in an asynchronous manner. In some embodiments, however, the host system 102 may be configured such that one or more APIs may be provided synchronously. In such configurations, the synchronous configuration of the system may provide feedback to the client device(s), allowing the client device(s) to make certain determinations as discussed in greater detail below.

As one of ordinary skill would appreciate, the host system 102 does not impose a requirement of a relational database for its various data stores (e.g., session database 138, version database 136, message queue 134, other data repositories 122, etc.). For example, a NoSQL database with secondary index support may suffice. In one embodiment, the database supporting the various data stores of the host system 102 is an Amazon Web Services (AWS) DynamoDB, although the database may be any NoSQL product having similar features and functionality.

In some embodiments, the host system 102 uses a communications interface 926 to communicate through network 14 with various mobile client devices 130a-130n and/or client devices 132a-132z. Mobile client devices 130a-130n may be configured to store and/or execute mobile applications 134a-134n. Client devices 132a-132z may be configured to store and/or execute Internet browser applications 136a-136z. As will be apparent to one of ordinary skill in the art, conventional client devices (e.g., smartphones, laptops, tablets, etc.) as defined above may be, and traditionally are, configured to execute mobile applications and browser applications. The separate treatment of mobile client devices 130a-130n and client devices 132a-132z discussed below is provided simply for illustration purposes and should not be deemed to limit the functionality of the term "client device" as used in the foregoing claims.

In some embodiments, the website client intercepting module 112 and the mobile client intercepting module 114 are configured to receive explicit and implicit data, including client device ID and other data indicative of various consumer events or activity (e.g., session creation, login, logout, etc.) and provide such data to the message queue 134 and/or visitor tracking module 110.

Figure 2A:
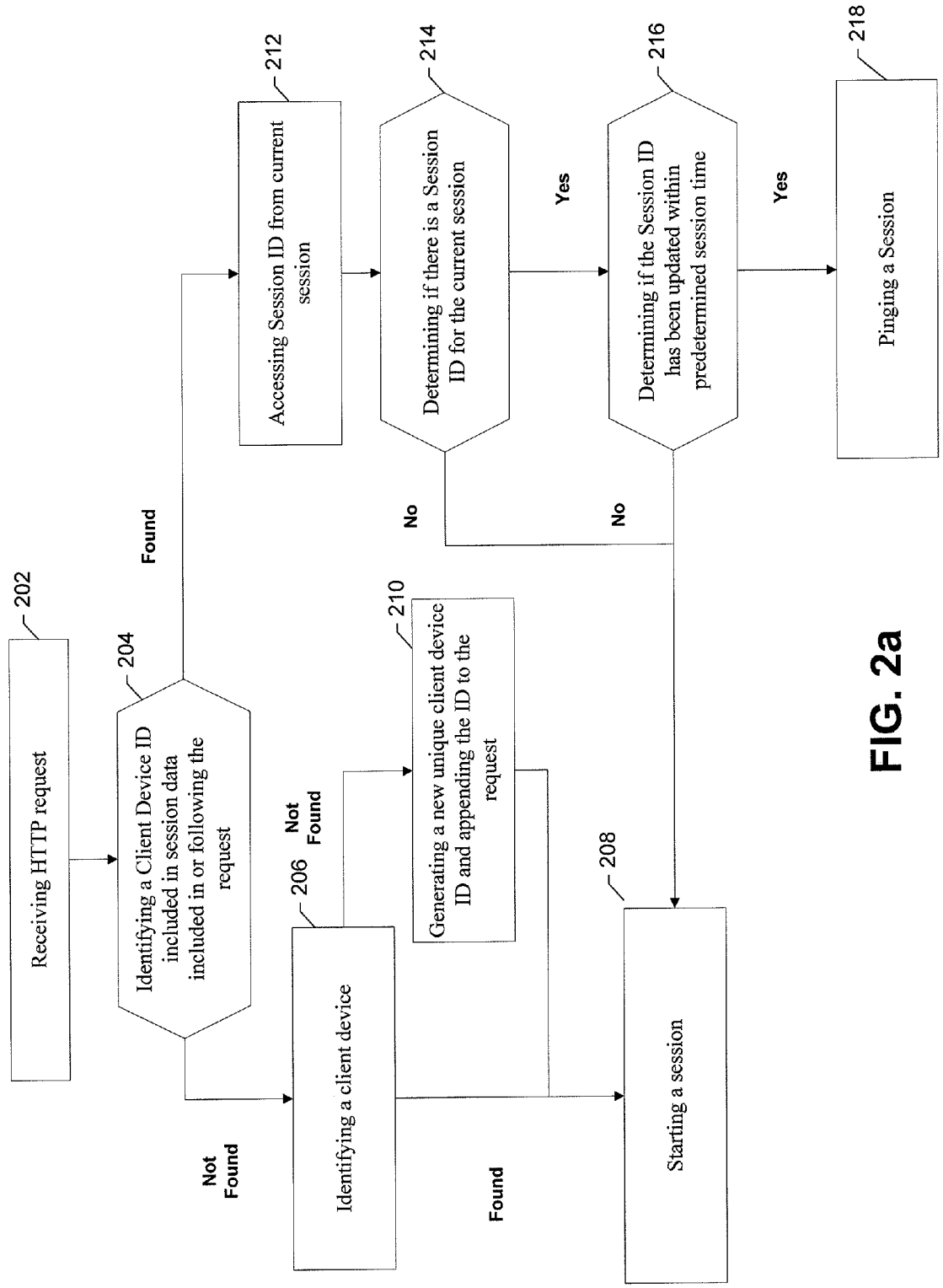
FIG. 2a is a flowchart illustrating a method for capturing consumer activity by a website client intercepting module, in accordance with an example embodiment.
Figure 2B:
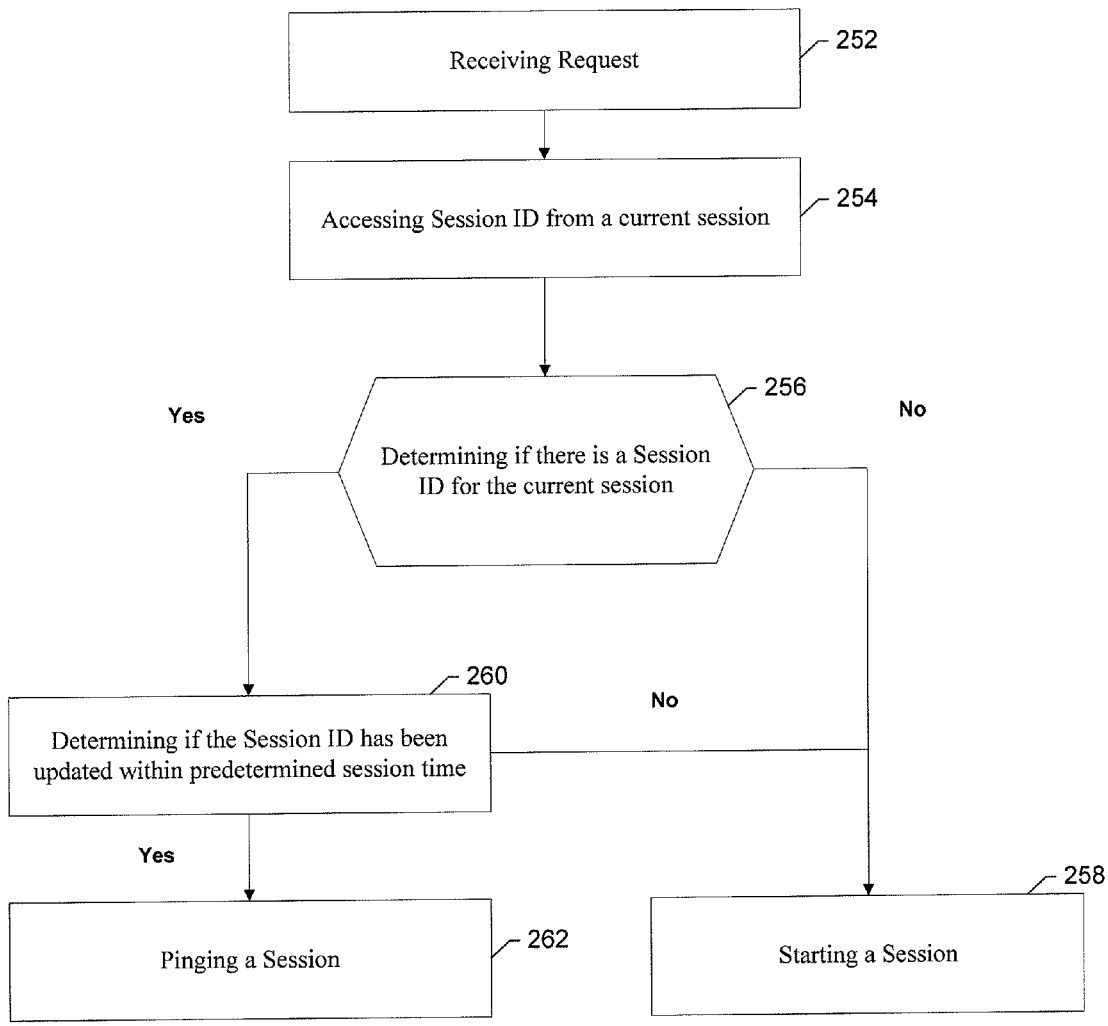
FIG. 2b is a flowchart illustrating a method for capturing consumer activity by a mobile client intercepting module, in accordance with an example embodiment.

Website Client Intercepting Module and Mobile Client Intercepting Module Process FIG. 2a shows an example process that may, in some embodiments, be executed by an example website client intercepting module 112 while FIG. 2b shows an example process that may, in some embodiments, be executed by an example mobile client intercepting module 114. The exemplary processes shown below allow various embodiments of the present invention to receive session data and identify a client device ID or consumer ID with which to associate the session data thus allowing the storing of consumer specific data in a centralized manner away from the client device.

As shown in block 202 of FIG. 2a, an apparatus, such as website client intercepting module 112 operated by a host system, may be configured for receiving a HTTP request or the like from a client device 132a-n over network 14. For example, a consumer may open a web browser on their computer, tablet, or mobile phone and direct their browser to a page associated with the promotion and marketing service. In some embodiments, as part of the request, or following the request, and as shown in block 204 of FIG. 2a, an apparatus, such as website client intercepting module 112, may be configured for identifying a client device ID by capturing, for example, one or both of available mutable or immutable data. For example, in some embodiments, one or more of a tracking cookie, serial number, build number, batch number, mac address and model name, etc., may be captured and used for identifying a client device ID. In some embodiments, a client device ID may be identified if the request is a single request in an existing session comprising a plurality of requests or if the browser has been previously utilized for accessing the website associated with the promotion and marketing service. In some embodiments, client device profile data may also be received by the website client intercepting module. Examples of a client device ID and/or client device profile data are discussed above.

In various embodiments, a client device ID may not be received or otherwise identified at block 204 following the request or as part of the request. In an instance in which a client device ID is not identified, an apparatus, such as website client intercepting module 112 operated by the host system, may be configured for receiving a client device ID from a cookie (e.g., a persistent cookie, or the like), as shown in block 206 of FIG. 2a. As one of ordinary skill in the art would appreciate, a cookie may be a small piece of data stored in a consumer's web browser that identifies the client device and/or the browser the consumer is utilizing.

Figure 3:
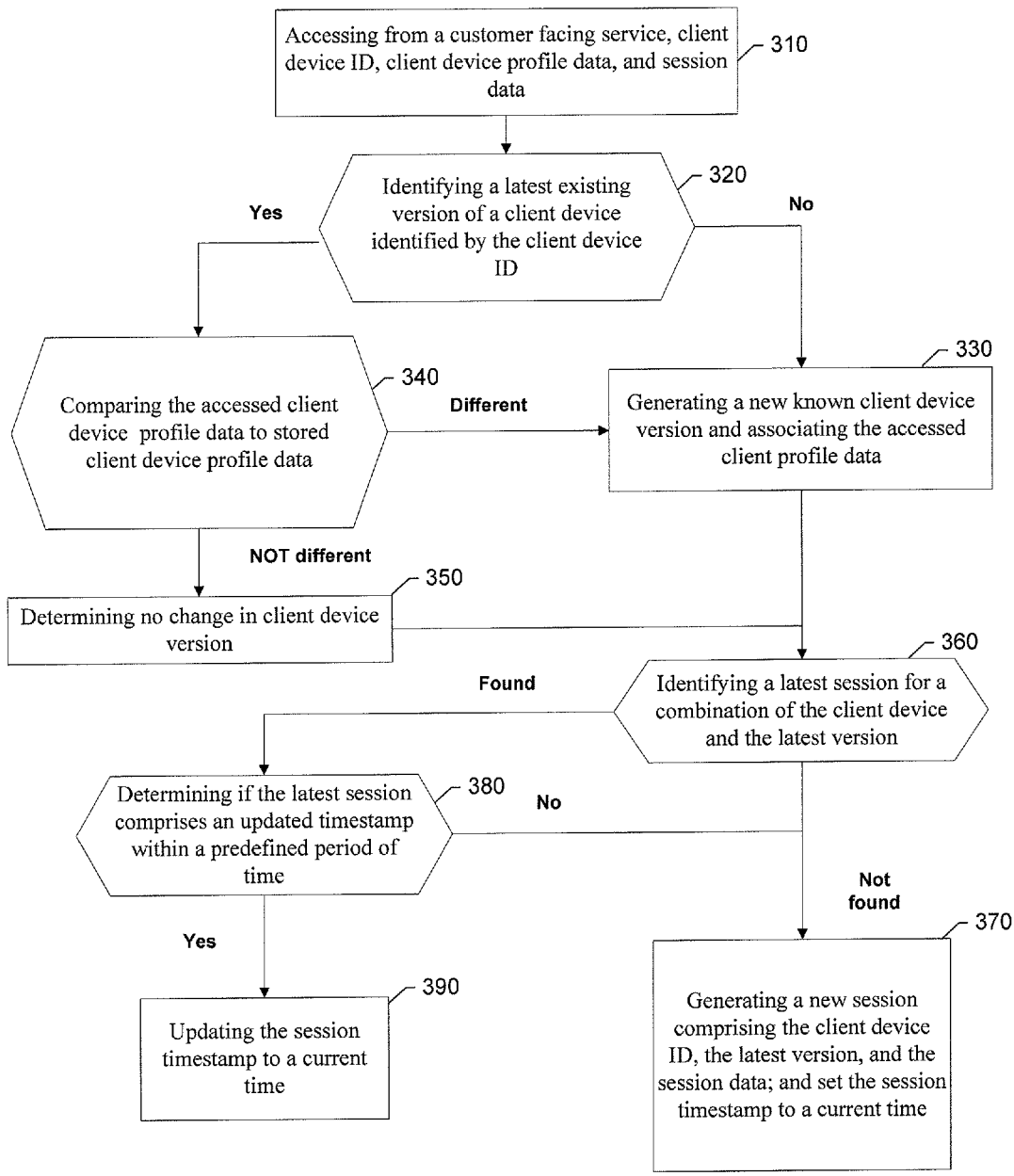
FIG. 3 is a flowchart illustrating a method for generating a session in accordance with an example embodiment.

Once the client device ID is obtained from the cookie, as shown in block 208 of FIG. 2a, an apparatus, such as website client intercepting module 112, may be configured for creating or generating a new session. In various embodiments, the apparatus may be configured for calling a function configured for generating a new session which may take as input, client device ID. FIG. 3 shows an exemplary process that may be executed in response to starting a new session.

In various embodiments, a client device ID is not identified. Such may be the case in instances where a consumer has deleted cookies from the client device or has never visited the website. In an instance in which the apparatus does not find the client device ID in a cookie, an apparatus, such as website client intercepting module 112, may be configured for generating a new unique client device ID and appending the new unique client device ID to a response to the request to make the client device store the new unique client device ID as a cookie, as shown in block 210 of FIG. 2a. By appending the new unique client device ID to the request, the new unique client device ID may then be stored as a cookie in the memory of the client device. Following the creation of the new unique client device ID, the apparatus may be configured for starting a new session with a client device ID associated with the new unique client device ID.

Returning to block 204, in an instance in which the client device ID is found, the process proceeds to block 212. As shown in block 212 of FIG. 2a, an apparatus, such as website client intercepting module 112, may be configured for receiving a Session ID in the request identifying a current session. For example, in some instances, the request will be a single request of a plurality of requests made during a single session. Next, as shown in block 214 of FIG. 2a, an apparatus, such as website client intercepting module 112, may be configured for determining if a Session ID exists for the current session.

In an instance in which a session ID does not exist, a new session is created. As such, the process proceeds to block 208, where a new session is created. In an instance in which a Session ID does exist, the process proceeds to block 216. As shown in block 216 of FIG. 2a, an apparatus, such as website client intercepting module 112, may be configured for determining if the Session ID has been updated within a predetermined session time. For example, in some embodiments, a Session ID may comprise a timestamp indicating a last known activity or ping timestamp indicating a last update time. The indication may be a clock time or, in some embodiments, may be a relative time (e.g., 5 minutes, 15 minutes) indicating how long ago a last activity or update was logged. As such, the predetermined session time, as discussed above, may represent a time in which, for example the host system, determines a new session should be created. For example, if a consumer's last logged activity was 15 minutes ago and a predetermined session time is 30 minutes, the host system may determine that a new session does not need to be generated. Whereas if the predetermined session time is 30 minutes and the last activity or update was 45 minutes ago, the host system may determine to start a new session.

Figure 4:
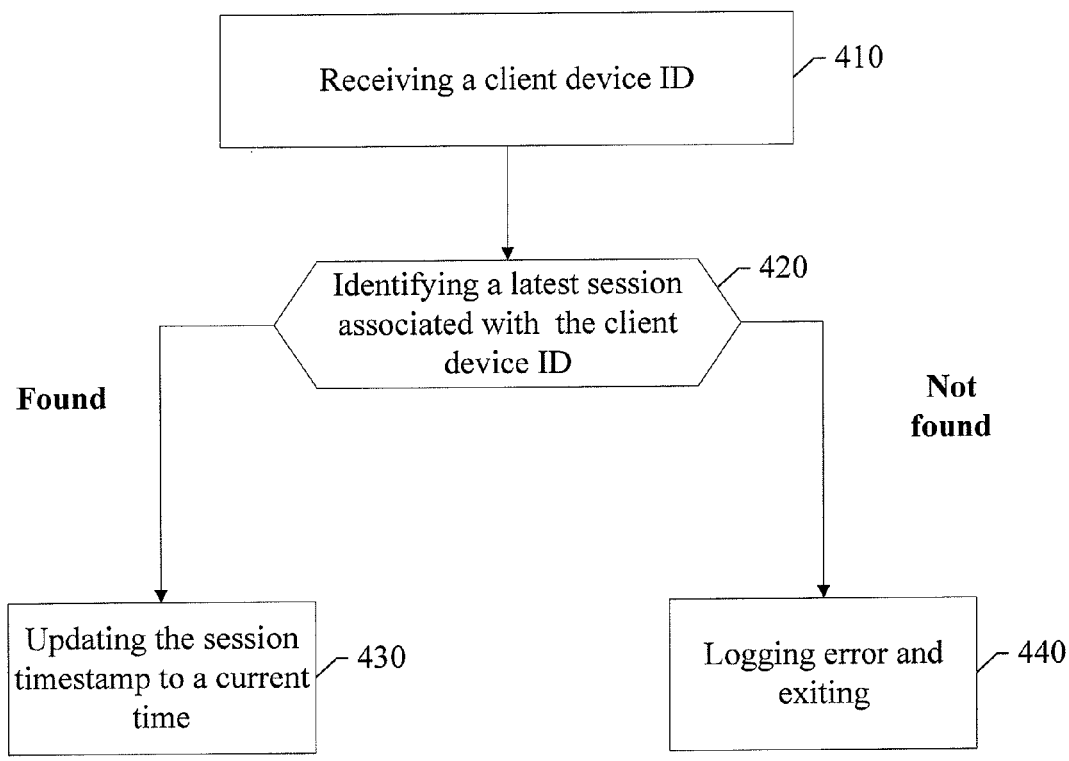
FIG. 4 is a flowchart illustrating a method for updating or pinging a session in accordance with an example embodiment.

Therefore, in various embodiments, in an instance in which the session ID indicates last activity outside of the predetermined session time, a new session is created, as shown in block 208. In an instance in which the session ID indicated an update within a predetermined session time, the process proceeds to block 218. As shown in block 218 of FIG. 2a, an apparatus, such as website client intercepting module 112, may be configured for updating the session ID. In various embodiments, a timestamp indicating a time of the last activity is updated. FIG. 4 shows an exemplary process that may be executed in response to updating a timestamp indicating a time of the last activity.

In some embodiments however, the predetermined session time may indicate how often a ping timestamp may be updated (e.g., every 5 minutes). For example, where a session ID is identified and the ping timestamp is within a predetermined session time, the apparatus may determine to not to start a new session and not update the ping timestamp. If the ping timestamp is outside a predetermined session time, the apparatus may determine to update the ping timestamp.

FIG. 2b, which shows an example process that may, in some embodiments, be executed by the mobile client intercepting module 114, may be similar to FIG. 2a, except that, in some embodiments, because a mobile device may provide a client device ID (e.g., may provide immutable data identifying the mobile device), a mobile client intercepting module 114 is able to access the client device ID.

As shown in block 252 of FIG. 2b, an apparatus, such as mobile client intercepting module 114, may be configured for receiving a request. For example, a consumer may execute an application associated with the marketing and promotion system on their computer, tablet, or mobile phone. Following receiving the request, and as shown in block 254 of FIG. 2b, an apparatus, such as mobile client intercepting module 114, may be configured for accessing a Session ID from a current session. Next, as shown in block 256 of FIG. 2b, an apparatus, such as mobile client intercepting module 114, may be configured for determining if a Session ID exists for the current session.

In an instance in which a session ID does not exist, a new session is created. As such, as shown in block 258 of FIG. 2b, an apparatus, such as mobile client intercepting module 114, may be configured for starting a new session. In various embodiments, the apparatus may be configured for calling a function for starting a new session and sending as the input, client device ID.

In an instance in which the apparatus at block 256 determines that there is a session ID for the current session, as shown in block 260 of FIG. 2b, an apparatus, such as mobile client intercepting module 114, may be configured for determining if the Session ID has been updated within a predetermined session time.

In an instance in which the session ID indicates last activity outside of the predetermined session time, a new session is created. In an instance in which the session ID indicates an update within a predetermined session time, the process proceeds to block 262. As shown in block 262 of FIG. 2b, an apparatus, such as mobile client intercepting module 114, may be configured for updating the session ID. In various embodiments, a timestamp indicating a time of the last activity is updated.

In various embodiments, if a mobile device does not provide or is not capable of providing a client device ID, such as an immutable unique identifier or the like, FIG. 2a may be executed. In some embodiments, however, when a mobile device does not provide or is not capable of providing a client device ID, such as an immutable unique identifier or the like, FIG. 2b may further comprise (not pictured) a step (similar to 210 of FIG. 2a) for generating a new unique client device ID and appending the new unique client device ID to the request, causing the new unique client device ID to be stored (e.g., in private storage of the mobile device or the like).

Both methods described above may be utilized in both a "multiple user single device" scenario or a "single user multiple device scenario". However, in various embodiments, a predetermined session time, which as described above, identifies when the host system may determine that a return of consumer activity is part of the originally identified session, may be changed when a particular scenario is identified. For example, in a "multiple user single device" scenario, a session may be closed after a shorter period of inactivity to avoid associating session data from two different sessions with each other. In some embodiments, when a session is created, the session comprises no timestamp indicating an end time of the session. When another session on the same device is created, a timestamp indicating the end time of the previous session may then be generated and/or set.

The methods shown in FIGS. 2a and 2b may represent processes that may be executed by both an asynchronous host system design and a synchronous host system design. In a synchronous host system design, any call of a service API may return data, thus causing the website to behave differently.

For example, in some embodiments, however, the system 100 may be configured such that one or more APIs (may return specific data to a website or mobile application, thus allowing or instructing the website or mobile application to display or behave differently based on what the API returns. For example, the a process for starting a session may return a result indicating that if a new session is created, if a new device is created, or the like, then the client device (website or mobile application) may display a specific page (e.g., a new page for a first time consumer or a first time user of the device). In another exemplary embodiment, if a function returns a result indicating a related session is expired, the website or mobile application may redirect to a specific page that shows a consumer that he has been idle for too long.

Starting a New Session

FIG. 3 shows an example method that may be executed by one or more machines, such as, for example consumer tracking module 110 operated by the host system 102 of FIG. 1, for generating a session, in accordance with some embodiments discussed herein. The exemplary process shown below for starting a session may allow the storing of consumer specific data into separate occurrences (e.g. sessions), which may be particularly helpful in the "multi-user single device" scenario where session data may be associated with one of a plurality of users of a client device.

As shown in block 310 of FIG. 3, an apparatus, such as consumer tracking module 110, may be configured for accessing one or more of a client device ID, client device profile data, and session data. As shown in block 320 of FIG. 3, an apparatus, such as consumer tracking module 110, may be configured for identifying a latest existing version of a client device identified by the client device ID. In various embodiments, the apparatus may be configured for accessing a client device profile database to identify a latest existing version of a client device identified by the client device ID.

In some embodiments, if a latest existing version is not able to be identified, as shown in block 330 of FIG. 3, an apparatus, such as consumer tracking module 110, may be configured for generating a new known client device version (and assigning it as the latest version of the client device) and associating the accessed client device profile data with the new known client device version.

However, in some embodiments, if a latest existing version of a client device is able to be accessed, as shown in block 340 of FIG. 3, an apparatus, such as consumer tracking module 110, may be configured for comparing the accessed client profile data to the latest existing version of the client device. In some embodiments, the apparatus may be configured for comparing the accessed client profile data to one or more of a plurality of known client device versions.

In response to the comparison, the apparatus may determine that the accessed client device profile data is different from client device profile data in any (e.g., the latest) of the plurality of known client device versions. In some embodiments, as one of ordinary skill in the art would appreciate in view of this disclosure, client device profile data, both stored and accessed, may be comprised of one or more of a model number, a model name, a model version, etc. as detailed above. And as such, in determining a difference in the accessed client device profile data from the stored client device profile data, one or more differences may be identified. In various embodiments, a subset of the client device profile data may be compared and used for the determination.

If the comparison block 340 determines a difference in the accessed client device profile data from the stored client device profile data, the process again proceeds to block 330, where the apparatus may generate a new known client device version. In some embodiments, the apparatus may associate the accessed client device profile data with the new known client device version.

If the comparison block 340 determines no difference, or in some embodiments, a difference of less than a predetermined threshold, the process proceeds to block 350. As shown in block 350 of FIG. 3, an apparatus, such as consumer tracking module 110, may be configured for determining that access is being requested by the latest existing client device version.

As shown in block 360 of FIG. 3, an apparatus, such as consumer tracking module 110, may be configured for, identifying a latest session for a combination of the client device ID and either the new known client device version or known client device version.

In an instance in which the latest session for a combination of the client device ID and either the new known client device version or known client device version is not able to be identified, the process proceeds to block 370, where a new session is generated. Accordingly, as shown in block 370 of FIG. 3, an apparatus, such as consumer tracking module 110, may be configured for, generating a new known client device session comprising the client identification ID, either the new known client device version or known client device version, and, optionally, the session data. Furthermore, in some embodiments, the apparatus may be configured for setting a session timestamp of the new known client device session to a current time.

If, however, the latest session for a combination of the client device ID and either the new known client device version or a known client device version is able to be identified in block 360, the process proceeds to block 380. As shown in block 380 of FIG. 3, an apparatus, such as consumer tracking module 110, may be configured for, determining if the latest session comprises a session timestamp that has been updated within a predefined period of time. If the latest session does not comprise a session timestamp that has been updated within a predefined period of time (e.g., 30 minutes), the process proceeds to block 370 where a new known client device session is generated.

In an instance in which the latest session does comprise an updated timestamp having been updated within a predefined period of time (e.g., 30 minutes), the process proceeds to block 390. As shown in block 390 of FIG. 3, an apparatus, such as consumer tracking module 110, may be configured for, may be configured for updating the session timestamp to a current time.

Pinging a Session

FIG. 4 shows an example method that may be executed by one or more machines, such as, for example consumer tracking module 110 operated by the host system 102 of FIG. 1, for updating or pinging a session, in accordance with some embodiments discussed herein. The exemplary process shown below for pinging a session may allow for the determination of whether newly received session data should be stored in an existing session or in a new session. This determination may allow the host system to accurately identify difference sessions and accurately store session data, which may be helpful in the "multi-user single device" scenario where session data may be utilized for identifying consumer interests, preferences, and making other inferential determinations, on a consumer by consumer basis.

As shown in block 410 of FIG. 4, an apparatus, such as consumer tracking module 110, may be configured for receiving a session ID. As shown in block 420 of FIG. 4, an apparatus, such as consumer tracking module 110, may be configured for identifying a latest session for the client device. For example, using session ID, a consumer tracking module may simply look the session ID up in a database configured for storing the session ID and related data and access the session related data directly.

In some embodiments, a latest session is able to be identified and the latest session is updated. Accordingly, as shown in block 430 of FIG. 4, an apparatus, such as consumer tracking module 110, may be configured for updating the session timestamp to a current time.

Figure 5:
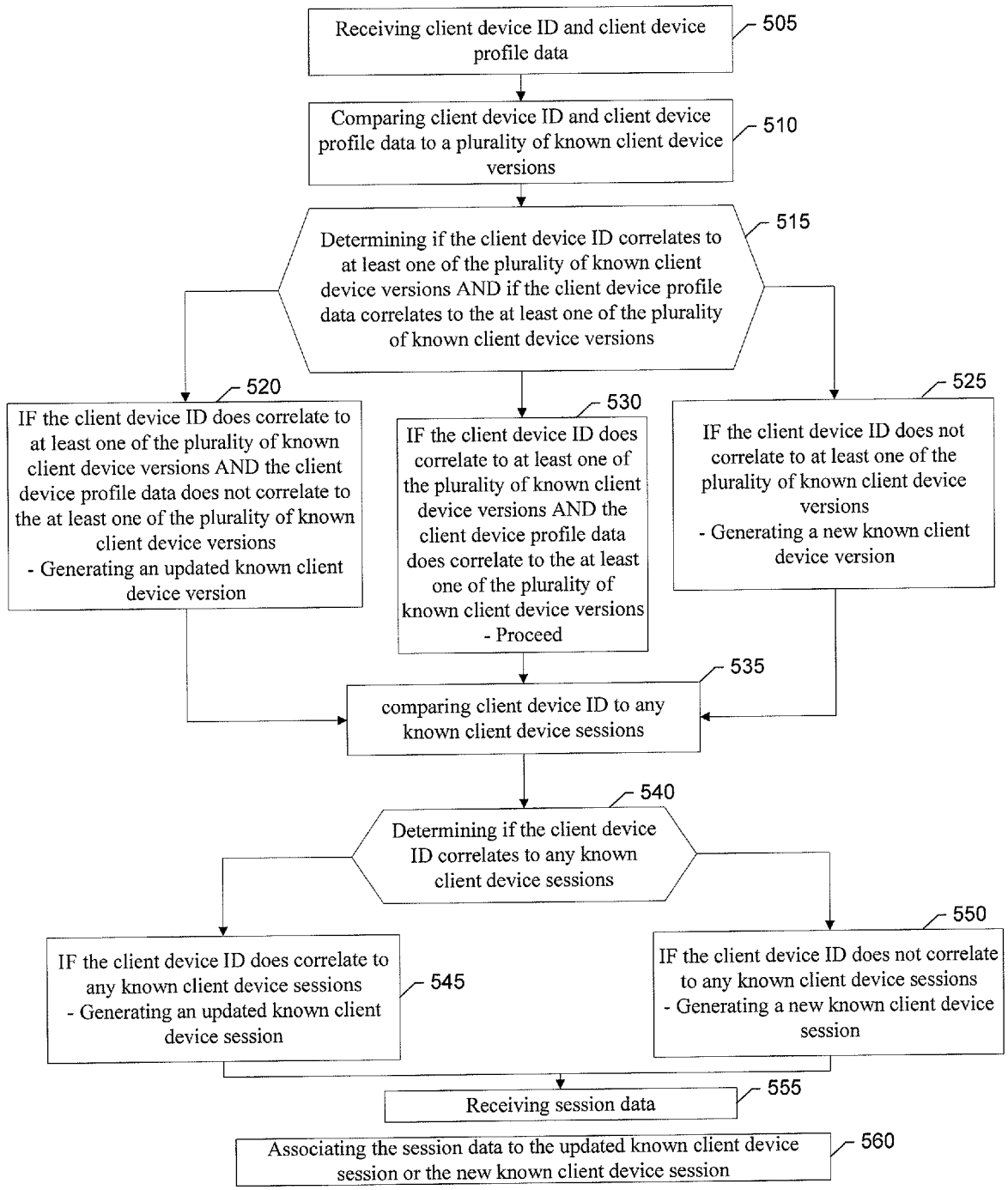
FIG. 5 is a flowchart illustrating a method for tracking consumer activity and associating session data indicative of such activity to a particular version and/or session.

In some embodiments, however, a latest session is not able to be identified. Accordingly, as shown in block 440 of FIG. 4, an apparatus, such as consumer tracking module 110, may be configured for logging an error and exiting Consumer Tracking Module Process FIG. 5 shows an example method that may be executed by one or more machines, such as, for example, the consumer tracking module 110 operated by the host system 102 of FIG. 1, for tracking consumer activity by at least one of a client device, version, or session, and associating session data indicative of such activity to a particular version and/or session, in accordance with some embodiments discussed herein. The exemplary process shown below allows for tracking consumer activity by client device, version, and session, which may allow the host system to identify consumer interests, preferences, and make other inferential determinations based on consumer specific data. For example, in the "multi-user single device" scenario, session data may be tracked and stored per session, allowing the tracking of multiple users on the same client device.

As shown in block 505 of FIG. 5, an apparatus, such as the consumer tracking module 110, may be configured for receiving client device ID and client device profile data. Examples of a client device ID and/or client device profile data are discussed in detail above.

As shown in block 510 of FIG. 5, an apparatus, such as the consumer tracking module 110, may be configured for comparing the client device ID and the client device profile data to a plurality of known client device versions. As shown in block 515 of FIG. 5, an apparatus, such as the consumer tracking module 110, may be configured for determining if the client device ID correlates to at least one of the plurality of known client device versions and if the client device profile data correlates to the at least one of the plurality of known client device versions.

In some embodiments, because a client device version may comprise client device profile data, which may in turn include one or more of a model number, a model name, a model version etc. (as described above), when determining a correlation in the client device ID and the client device profile data with one or more of a plurality of known client device versions, one or more differences may be identified. In some embodiments, based on the one or more differences, a correlation value may be calculated. A correlation may then be determined based on whether the correlation value meets a predetermined threshold. In some embodiments, a subset of the client device profile data may be compared and used for the correlation determination and/or the correlation value calculation. For example, correlation between a client device ID, client device profile data, and a plurality of known client device versions may utilize, in the browser setting, for example, browser user-agent, version, and mac address. In some embodiments, for example, for a mobile application, correlation may utilize OS type and version, kernel version, and App version.

If the client device ID does correlate to at least one of the plurality of known client device versions and the client device profile data does not correlate, or fails to meet a correlation value threshold, when compared to the at least one of the plurality of known client device versions, a consumer tracking module may generate an updated known client device version. As such, as shown in block 520 of FIG. 5, an apparatus, such as the consumer tracking module 110, may be configured for generating an updated known client device version in an instance in which the client device ID correlates to at least one of the plurality of known client device versions and the client device profile data does not correlate to the at least one of the plurality of known client device versions.

However, if the client device ID does not correlate to at least one of the plurality of known client device versions, a consumer tracking module 110 may generate a new known client device version. Accordingly, as shown in block 525 of FIG. 5, an apparatus, such as the consumer tracking module 110, may be configured for generating a new known client device version in an instance in which the client device ID does not correlate to at least one of the plurality of known client device versions.

In some instances, the client device ID does correlate to at least one of the plurality of known client device versions and the client device profile data does correlate to the at least one of the plurality of known client device versions. Accordingly, as shown in block 530 of FIG. 5, an apparatus, such as the consumer tracking module 110, may be configured for determining that the client device ID does correlate to at least one of the plurality of known client device versions and the client device profile data does correlate to the at least one of the plurality of known client device versions.

In some embodiments, versions may continue to increase only. For example, the client device ID and client device profile data may be compared to a latest known client device version and, if different, a new version may then be generated. Specifically, in 510 of FIG. 5, the client device ID and client device profile data may be compared to a latest known client device version. In 515, a determination may be made whether the client device ID and client device profile data are different from the latest known client device version. An updated known client device version may then be generated in an instance in which the client device ID correlates to latest known client device version and the client device profile data does not correlate to the latest known client device version. A new known client device version may be generated in an instance in which the client device ID does not correlate to latest known client device version.

As shown in block 535 of FIG. 5, an apparatus, such as the consumer tracking module 110, may be configured for comparing client device ID to any known client device sessions and as shown in block 540 of FIG. 5, an apparatus, such as the consumer tracking module 110, may then be configured for determining if the client device ID correlates to any known client device sessions.

In some embodiments, the client device ID does correlate to one or more known client device sessions, and as such, a consumer tracking module may generate an updated known client device session. Accordingly, as shown in block 535 of FIG. 5, an apparatus, such as the consumer tracking module 110, may be configured for generating an updated known client device session in an instance in which the client device ID correlates to any known client device sessions.

However, in some embodiments, the client device ID may not correlate to any known client device sessions and the consumer tracking module may generate a new known client device session. Accordingly, as shown in block 550 of FIG. 5, an apparatus, such as the consumer tracking module 110, may be configured for generating a new known client device session in an instance in which the client device ID does not correlate to any known client device sessions.

Alternatively, in some embodiments, an apparatus, such as the consumer tracking module 110, may be configured for generating an updated known client device session in an instance in which the client device ID does correlate to one of the any known client device sessions, if, for example, a timestamp associated with the one of the any known client device sessions satisfies a predetermined threshold. For example, if the timestamp, which may indicate a time of a last update or a last activity, indicates that the last update or activity occurred within a predetermined time in the past (e.g., 5 minutes, 10 minutes, 30 minutes, etc.), an updated known client device session may be generated. In other words, in some embodiments, although the client device ID may correlate to one of the any known client device sessions, a new known client device session may be generated when a timestamp associated with the one of the any known client device sessions fails to satisfy the predetermined threshold.

In some embodiments, sessions may continue to be generated in order to capture session data. Specifically, in 535 of FIG. 5, in some embodiments, the client device ID may be compared to a last known client device session. An updated known client device session may then be generated in an instance in which the client device ID correlates to the last known client device session. A new known client device session may be generated in an instance in which the client device ID does not correlate to last known client device session.

As shown in block 555 of FIG. 5, an apparatus, such as the consumer tracking module 110, may be configured for receiving session data. As shown in block 560 of FIG. 5, an apparatus, such as the host system 110 or consumer tracking module 110, may be configured for associating the session data to the updated known client device session or the new known client device session.

As one of ordinary skill would appreciate, each step of the above recited processes need not be performed when tracking consumer activity and associating session data indicative of such activity to a particular version and/or session. For example, in various embodiments, session data may be received within a predetermined amount of time, and in such instances, blocks 515 through 535 may need not be performed. Furthermore, as one of ordinary skill would appreciate in view of this disclosure, the above recited steps may not be performed in the order provided. In some embodiments, blocks 535 through 550 may be performed before 515 through 525 and in some instances, based on the results of the determining block of 540, blocks 515 through 525, or some portion thereof may not be performed. In one exemplary embodiment, for example, if based on the determining block of 540, the process determines that the client device ID does correlate to a known client device sessions, and an updated known client device session is generated, the determination block of 515 need not be performed.

Attaching and Detaching a Consumer ID

Figure 6:
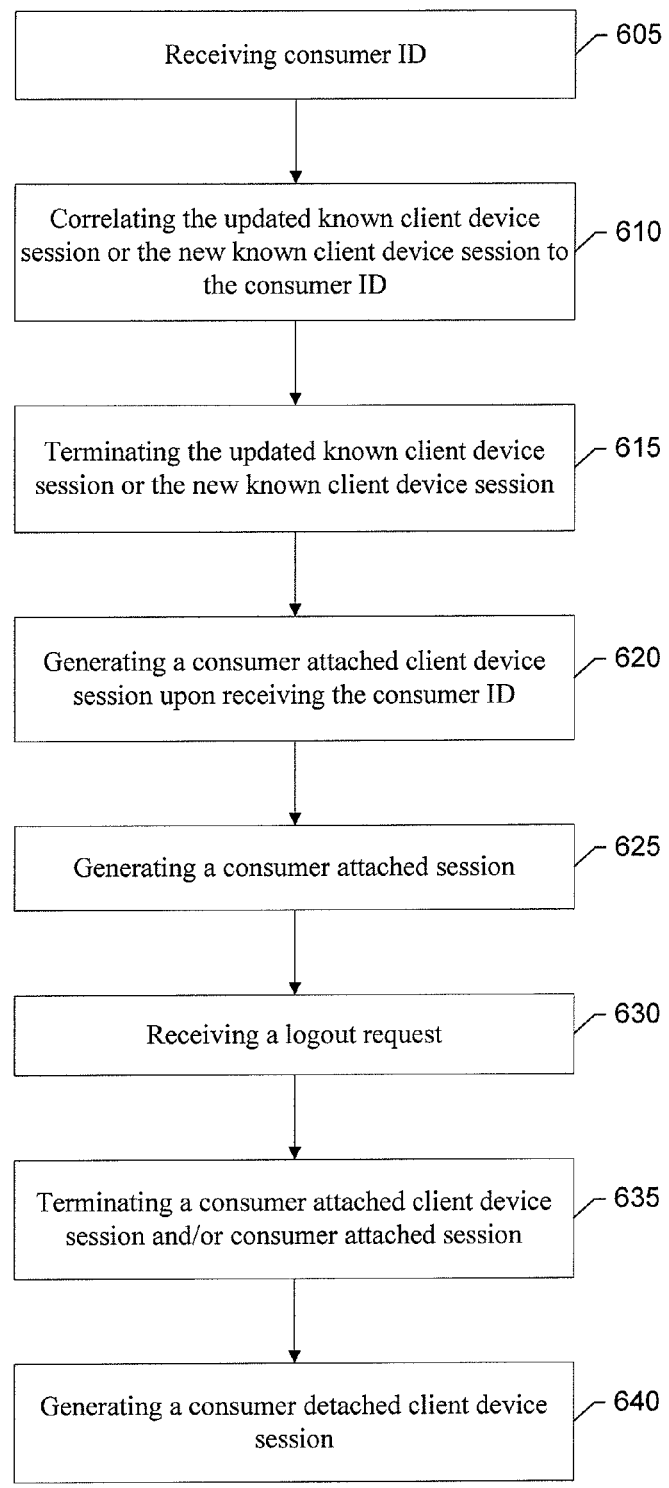
FIG. 6 is a flowchart illustrating a method for attaching and/or detaching a consumer ID to/from a session in accordance with an example embodiment.

FIG. 6 shows an example method that may be executed by one or more machines, such as, for example the consumer tracking module 110 operated by the host system 102 of FIG. 1, for attaching and/or associating, disassociating, attaching or detaching a consumer ID, in accordance with some embodiments discussed herein. The exemplary process shown below allows for tracking consumer activity by consumer ID, which may allow the host system to identify consumer interests and preferences, which may be used to make other inferential determinations. For example, knowing particular preferences of a consumer based on her consumer attached client device session data or consumer attached session data may allow the correlation to consumer detached session data. The correlation, for example, may then allow a consumer specific website experience even when the consumer is not logged in. In some embodiments, for example, "single user multiple device" scenario, a consumer specific experience may be provided when a consumer logs into a new device for the first time based on consumer attached session data or consumer attached client device session data.

Figure 7A:
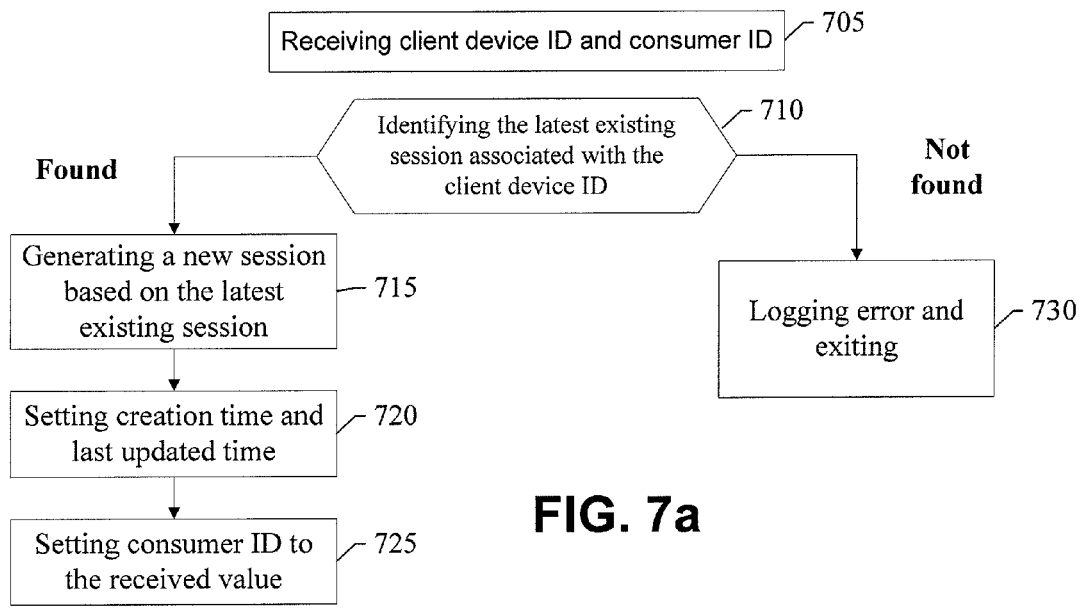
FIG. 7a is a flowchart illustrating a method for attaching a consumer ID to a session in accordance with an example embodiment.
Figure 7B:
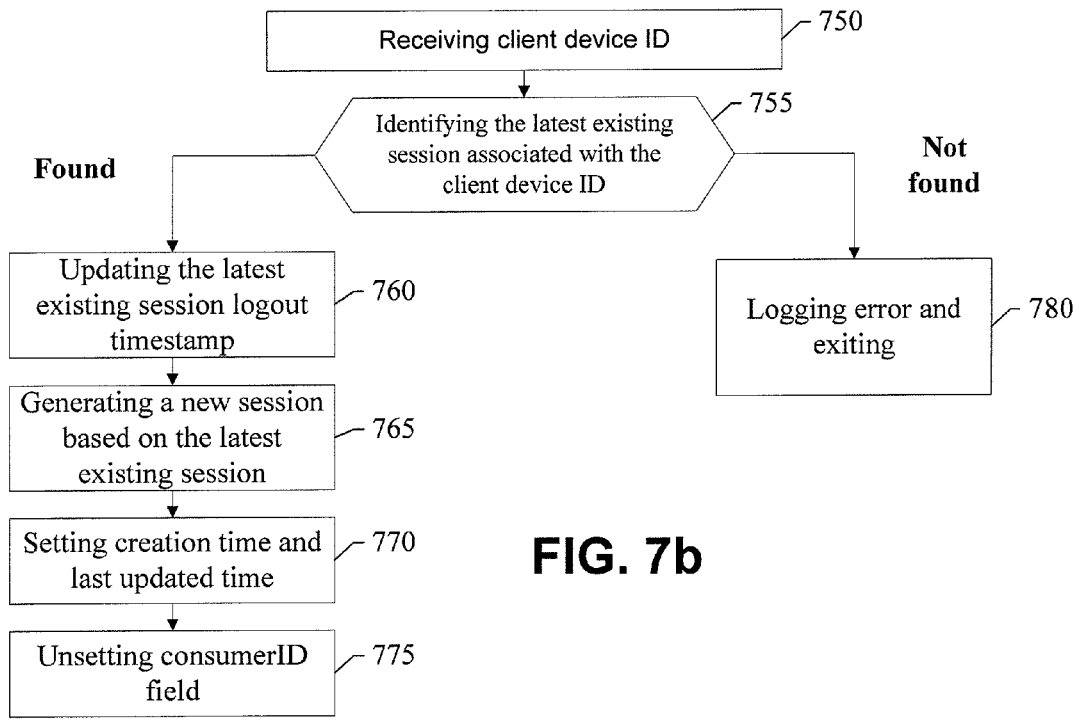
FIG. 7b is a flowchart illustrating a method for detaching a consumer ID from a session in accordance with an example embodiment.

As shown in block 605 of FIG. 6, an apparatus, such as consumer tracking module 110, may be configured for receiving a consumer ID. As discussed above, in one embodiment, the consumer ID may be transmitted by a client device to the host system in connection with a consumer logging in to a website or mobile application of the promotion and marking service. Notably, FIG. 6 provides an overview of consumer ID attaching and detaching operations while FIGS. 7a and 7b provide additional detail for such operations.

In various embodiments, for use in a "multi-user single device" scenario, as shown in block 610 of FIG. 6, an apparatus, such as consumer tracking module 110, may be configured for correlating the updated known client device session or the new known client device session to the consumer ID. As shown in block 615 of FIG. 6, an apparatus, such as consumer tracking module 110, may be configured for terminating the updated known client device session or the new known client device session. As shown in block 620 of FIG. 6, an apparatus, such as consumer tracking module 110, may be configured for generating a consumer attached client device session upon receiving the consumer ID. FIG. 7a shows a function that may be called to generate a consumer attached client device session.

In some embodiments, for use in, for example a "single user multiple device" scenario, a consumer attached session may be generated. As such, as shown in block 625 of FIG. 6, an apparatus, such as consumer tracking module 110, may be configured for generating a consumer attached session.

As shown in block 630 of FIG. 6, an apparatus, such as consumer tracking module 110, may be configured for receiving a logout request. As shown in block 635 of FIG. 6, an apparatus, such as consumer tracking module 110, may be configured for terminating a consumer attached client device session and/or consumer attached session associated with the consumer ID upon receipt of the logout request. As shown in block 640 of FIG. 6, an apparatus, such as consumer tracking module 110, may be configured for generating a consumer detached client device session. FIG. 7B shows a function that may be called to generate a consumer detached client device session.

Attaching Consumer ID

FIG. 7a shows a more detailed example method, as compared to FIG. 6, that may be executed by one or more machines, such as, for example, the consumer tracking module 110 operated by the host system 102 of FIG. 1, for attaching a consumer ID to a session in accordance with some embodiments discussed herein.

As shown in block 710 of FIG. 7a, an apparatus, such as consumer tracking module 110, may be configured for identifying the latest existing session associated with the client device ID. In some embodiments, the latest existing session is able to be identified. Therefore, as shown in block 715 of FIG. 7a, an apparatus, such as the consumer tracking module 110, may be configured for creating a copy of latest existing session.

As shown in block 720 of FIG. 7a, an apparatus, such as consumer tracking module 110, may be configured for setting one or more particular timestamps to a creation time and/or a last updated time. Furthermore, in various embodiments, as shown in block 725 of FIG. 7, an apparatus, such as consumer tracking module 110, may be configured for setting a consumer ID field to the received consumer ID.

In some embodiments, the latest existing session is unable to be identified. Accordingly, as shown in block 730 of FIG. 7a, an apparatus, such as consumer tracking module 110, may be configured for logging an error and exiting.

Detaching Consumer ID

FIG. 7b shows a more detailed example method, as compared to FIG. 6, that may be executed by one or more machines, such as, for example consumer tracking module 110 operated by the host system 102 of FIG. 1, for detaching a consumer ID from a session, in accordance with some embodiments discussed herein.

As shown in block 750 of FIG. 7b, an apparatus, such as consumer tracking module 110, may be configured for receiving a client device ID. As shown in block 755 of FIG. 7, an apparatus, such as consumer tracking module 110, may be configured for identifying the latest existing session associated with the client device ID.

In an instance in which a latest existing session associated with the client device ID is identified, as shown in block 760 of FIG. 7b, an apparatus, such as consumer tracking module 110, may be configured for updating a timestamp associated with the logout information. As shown in block 765 of FIG. 7b, an apparatus, such as consumer tracking module 110, may be configured for generating a new session, the new session being a copy of latest existing session. As shown in block 770 of FIG. 7b, an apparatus, such as consumer tracking module 110, may be configured for setting a timestamp associated with one of a creation time or a last updated time.

As shown in block 775 of FIG. 7b, an apparatus, such as consumer tracking module 110, may be configured for unsetting a consumer ID on the new session. As shown in block 780 of FIG. 7b, an apparatus, such as consumer tracking module 110, may be configured for logging an error and exiting.

Weighting

Figure 8:
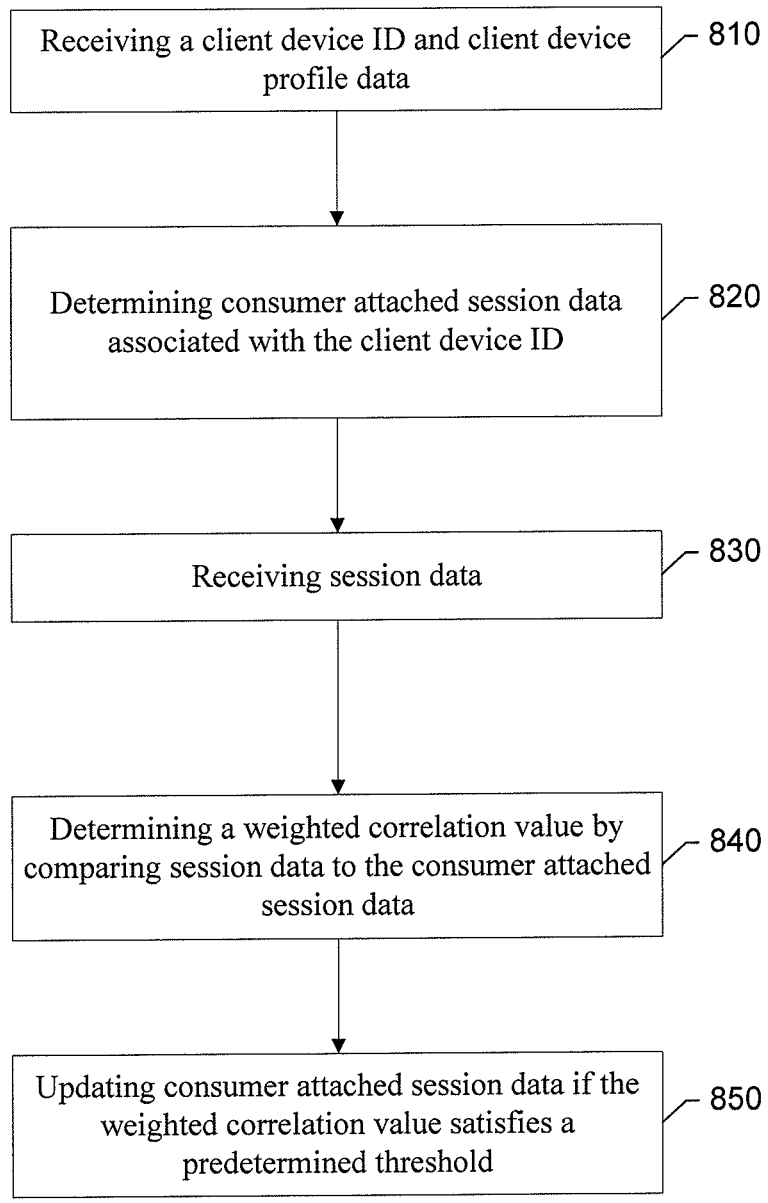
FIG. 8 is a flowchart illustrating a method for updating consumer attached session data in accordance with an example embodiment.

FIG. 8 shows an example method that may be executed by one or more machines, such as, for example, the consumer tracking module 110 operated by the host system 102 of FIG. 1, for updating consumer attached session data if a weighted correlation value satisfies a predetermined threshold, in accordance with some embodiments discussed herein. In other words, in some embodiments, correlation of the consumer attached session data to currently received session data may be improved by implementing a weighting scheme or algorithm where particular details of the session data may be more indicative than other details (e.g., click data into a specific category may be more indicative of a particular consumer than idle time spent on a specific page). In some embodiments, different weights may be used for each of one or more client device IDs, consumer IDs, particular time periods or the like for each of one or more details of the session data.

As shown in block 810 of FIG. 8, an apparatus, such as consumer tracking module 110, may be configured for receiving a client device ID and client device profile data. As shown in block 820 of FIG. 8, an apparatus, such as consumer tracking module 110, may be configured for determining consumer attached session data associated with the client device ID. As shown in block 830 of FIG. 8, an apparatus, such as consumer tracking module 110, may be configured for receiving session data.

As shown in block 840 of FIG. 8, an apparatus, such as consumer tracking module 110, may be configured for determining a weighted correlation value by comparing session data to the consumer attached session data. For example, depending on the pages viewed (or content accessed by the mobile application) and how long the client device spent on each page (or accessing content), the apparatus may be configured to (1) correlate the activity (e.g., current session data) to previous or known session data; (2) determine preferences or inferences and store an aggregated weighted preference list by session, client device ID, and/or consumer ID.

As shown in block 850 of FIG. 8, an apparatus, such as consumer tracking module 110, may be configured for updating consumer attached session data if the weighted correlation value satisfies a predetermined threshold.

In a synchronous configuration of the system, using weighted preferences, explicit data, or implicit data, identifying or receiving a particular client device ID (e.g., a known device, a new device, a device that has been absent for a period of time, etc.) and/or consumer ID may prompt the system to cause the website or mobile application to display a specific page and/or page layout (e.g., a specific page for a new client device, a featured travel offer on front page for a device shown to have a high preference for such offers, etc.). Specific pages may be tailored to specific locations or for certain durations or time of year or the like depending on determined preferences. In other words, each request may return client device ID specific and/or consumer ID specific results. In another exemplary embodiments, if a consumer has been idle too long (e.g., a session is expired), the website may redirect to a specific page indicating or informing the consumer that she has been idle too long.

In some embodiments, after receiving the client device ID, one or more consumer IDs associated with the client device ID may be determined by identifying any known consumer attached client device sessions associated with the client device ID and identifying the consumer IDs associated with those consumer attached client device sessions. The apparatus may be configured to then comparing the session data to consumer associated client device profile data or to consumer profile data and determining a likelihood that the session data should be associated with each of one or more of the determined consumer IDs.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

Figure 9:
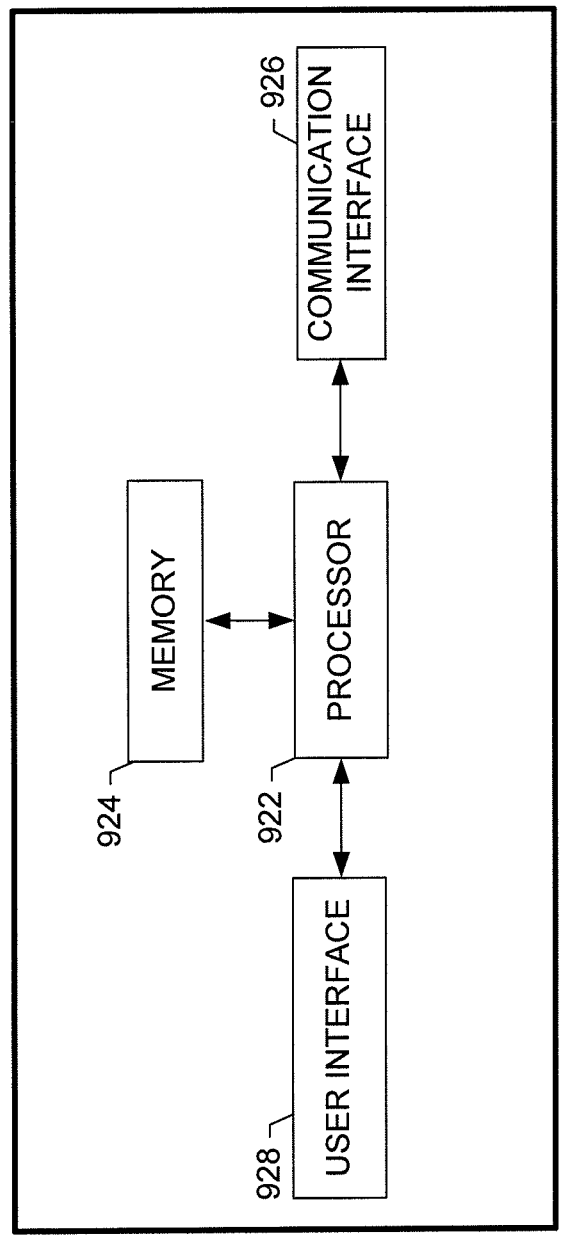
FIG. 9 is a block diagram of an apparatus that may be specifically configured in accordance with an example embodiment of the present invention.

For example, in reference to FIG. 9, one or more of the procedures described herein may be embodied by computer program instructions. In this regard, the computer program instructions which embody the procedures described above may be stored by a memory 924 of an apparatus employing an embodiment of the present invention and executed by a processor 922 in the apparatus.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions. In some embodiments, certain ones of the operations herein may be modified or further amplified. Moreover, in some embodiments additional optional operations may also be included. It should be appreciated that each of the modifications, optional additions or amplifications may be included with the operations, either alone or in combination with any others among the features described herein.

Computing Device Architecture

In some embodiments of the present invention, an apparatus, such as a system 100, the host system 102, the consumer tracking module 110, the website client intercepting module 112, the mobile client intercepting module 114 may be embodied by a computing device. The computing device may include or be associated with an apparatus 900 as shown in FIG. 9. In this regard, the apparatus may include or otherwise be in communication with a processor 922, a memory device 924, a communication interface 926 and a user interface 928. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 922 (and/or co-processors or any other processing circuitry assisting or otherwise associated with the processor) may be in communication with the memory device 924 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 1500 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 500 may be embodied by the classification and tagging apparatus 100 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 922 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 922 may be configured to execute instructions stored in the memory device 924 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 928.

Meanwhile, the communication interface 926 may be any means such as a device or circuitry embodied in either hardware or a combination of hardware and software that is configured to receive and/or transmit data between the computing device 10 and a server 12. In this regard, the communication interface 926 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays 10, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 928 may be in communication with the processor 922, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 924 and/or the communication interface 926, such as via a bus.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Referring back to FIG. 1, which shows an example block diagram for practicing embodiments of a promotion and marketing system 100 and/or host system 102. Note that one or more general purpose or special purpose computing systems/devices may be used to implement the host system 102. In addition, the host system 102 may comprise one or more distinct computing systems/devices and may span distributed locations. Furthermore, each block shown may represent one or more such blocks as appropriate to a specific embodiment or may be combined with other blocks. For example, in some embodiments the host system 102 may contain a consumer tracking module 110, a website client intercepting module 112, a mobile client intercepting module 114, or a combination thereof. In other example embodiments, the consumer tracking module 110, the website client intercepting module 112, and/or the mobile client intercepting module 114 may be configured to operate on separate systems (e.g. a mobile terminal and a remote server, multiple remote servers and/or the like). For example, the consumer tracking module 110, the website client intercepting module 112, and/or the mobile client intercepting module 114 may be configured to operate on a mobile terminal. Also, host system 102 may be implemented in software, hardware, firmware, or in some combination to achieve the capabilities described herein.

While the host system 102 may be employed, for example, by a mobile terminal 10, stand-alone system (e.g. remote server), it should be noted that the components, devices or elements described below may not be mandatory and thus some may be omitted in certain embodiments. Additionally, some embodiments may include further or different components, devices or elements beyond those shown and described herein.

In the embodiment shown, host system 102 comprises a computer memory ("memory") 924, one or more processors 922 (e.g. processing circuitry) and a communications interface 928. The computing device(s) are shown residing in memory 924. In other embodiments, some portion of the contents, some or all of the components of the system 100 may be stored on and/or transmitted over other computer-readable media. The components of the system 100 preferably execute on one or more processors 922 and are configured for tracking, storing and/or retrieving user related data across different device stages and/or multiple channels. Other code or programs 120 (e.g., an administrative interface, a Web server, and the like) and potentially other data repositories, such as data repository 122, also reside in the memory 924, and preferably execute on processor 922. Of note, one or more of the components in FIG. 1 may not be present in any specific implementation.

In a typical embodiment, host system 102 interacts via the network 14 via a communications interface 926 with mobile client devices 130a-130n and/or client devices 132a-132z. The network 14 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. In this regard, the communications interface 926 may be capable of operating with one or more air interface standards, communication protocols, modulation types, access types, and/or the like.

In an example embodiment, components/modules of host system 102 may be implemented using standard programming techniques. For example, the system 100 may be implemented as a "native" executable running on the processor 922, along with one or more static or dynamic libraries. In other embodiments, the system 100 may be implemented as instructions processed by a virtual machine that executes as one of the other programs 120. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the system 100, can be made available by standard mechanisms such as through C, C++, C#, and Java APIs; libraries for accessing files, databases, or other data repositories; through languages such as XML; or through Web servers, FTP servers, or other types of servers providing access to stored data. A data store may also be included and it may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the host system 102 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Some or all of the system components and data structures may also be stored as a web application, "app", or any HTML5 or JavaScript™ application, such as a computer software application that is coded in a browser-supported programming language (such as JavaScript™) combined with a browser-rendered markup language like HTML5, reliant on a common web browser to render the application executable. The opening of a web page, "mobile app", or "app" may be performed by a web browser on a mobile client device. An HTML5 or JavaScript™ "app" allows web page script to contact a server for storing and retrieving data without the need to re-download an entire web page. Some or all of the system components and data structures may also be stored as a privileged web application or privileged web app. A privileged web app is a piece of web content that may have been verified by, for example, means of an app store or stores or may have obtained or downloaded from a source that is trusted source. A trusted source may provide a privileged web app that may be enabled to override the default power settings. Such computer program products may also take other fauns in other embodiments. Accordingly, embodiments of this disclosure may be practiced with other computer system configurations.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for monitoring and identifying mobile application and web browser activity of a client device, the method comprising:
    receiving client device ID and client device profile data;
    comparing client device ID and client device profile data to a plurality of known client device versions, the known client device version being a data entity generated by a host system that identifies a particular instance of a client device;
    generating an updated known client device version in an instance in which the client device ID correlates to at least one of the plurality of known client device versions and the client device profile data does not correlate to the at least one of the plurality of known client device versions;
    generating a new known client device version in an instance in which the client device ID does not correlate to at least one of the plurality of known client device versions;
    comparing client device ID to any known client device sessions, a known client device session being a data entity generated by a host system that captures, identifies, or embodies an instance or a period of consumer activity associated with a website or mobile application, the comparing of the client device ID to any known client device sessions comprising:
    determining when to close a session based on captured indications of consumer activity for the period of consumer activity; associating a session timestamp, which is a data entity that may be included in a session ID for indicating a time of last consumer activity, at each instance of consumer activity; and identifying, upon reception of an indication indicative of new consumer activity, whether a stop in consumer activity meets a predetermined threshold; based on the session timestamp, a session time being a predetermined time of inactivity in which the host system may determine that subsequent consumer activity is part of an originally identified session;
    generating an updated known client device session in an instance in which the client device ID correlates to any known client device sessions;
    generating a new known client device session in an instance in which the client device ID does not correlate to any known client device sessions;
    receiving a consumer ID; and
    correlating the updated known client device session or the new known client device session to a consumer session reference based on the consumer ID.

2. The method of claim 1, further comprising:
    generating the updated known client device session in an instance in which the client device ID correlates to one of the any known client device sessions and a timestamp associated with the one of the any known client device sessions satisfies a predetermined threshold.

3. The method of claim 1, wherein the client device ID and client device profile data are compared to a latest known client device version, and
    wherein an updated known client device version is generated in an instance in which the client device ID correlates to latest known client device version and the client device profile data does not correlate to the latest known client device version, and
    a new known client device version is generated in an instance in which the client device ID does not correlate to latest known client device version.

4. The method of claim 1, wherein the client device ID is compared to a last known client device session, and
    wherein an updated known client device session is generated in an instance in which the client device ID correlates to the last known client device session, and
    a new known client device session is generated in an instance in which the client device ID does not correlate to last known client device session.

5. The method of claim 1, further comprising:
    terminating the updated known client device session or the new known client device session; and
    generating a consumer attached client device session upon receiving the consumer ID.

6. The method of claim 5, further comprising:
receiving a logout request;
terminating the consumer attached client device session; and
generating a consumer detached client device session.

7. The method of claim 1, wherein client device profile data comprises at least one of browser type, internet protocol (IP) address, or device model.

8. The method of claim 2, further comprising:
generating a new timestamp based on a current time for association with the updated known client device session.

9. The method of claim 1, further comprising:
receiving session specific data; and
associating the session specific data to the updated known client device session or the new known client device session.

10. A computer program product for monitoring and identifying mobile application and web browser activity of a client device, the computer program product comprising at least one computer-readable storage medium having computer-executable program code instructions stored therein, the computer-executable program code instructions comprising program code instructions for:
receiving client device ID and client device profile data;
comparing client device ID and client device profile data to a plurality of known client device versions, the known client device version being a data entity generated by a host system that identifies a particular instance of a client device;
generating an updated known client device version in an instance in which the client device ID correlates to at least one of the plurality of known client device versions and the client device profile data does not correlate to the at least one of the plurality of known client device versions;
generating a new known client device version in an instance in which the client device ID does not correlate to at least one of the plurality of known client device versions;
comparing client device ID to any known client device sessions, a known client device session being a data entity generated by a host system that captures, identifies, or embodies an instance or a period of consumer activity associated with a website or mobile application, the comparing of the client device ID to any known client device sessions comprising:
determining when to close a session based on captured indications of consumer activity for the period of consumer activity; associating a session timestamp, which is a data entity that may be included in a session ID for indicating a time of last consumer activity, at each instance of consumer activity; and identifying, upon reception of an indication indicative of new consumer activity, whether a stop in consumer activity meets a predetermined threshold; based on the session timestamp, a session time being a predetermined time of inactivity in which the host system may determine that subsequent consumer activity is part of an originally identified session;
generating an updated known client device session in an instance in which the client device ID correlates to any known client device sessions;
generating a new known client device session in an instance in which the client device ID does not correlate to any known client device sessions;
receiving a consumer ID; and
correlating the updated known client device session or the new known client device session to a consumer session reference based on the consumer ID.

11. The computer program product according to claim 10, wherein the computer-executable program code instructions further comprise program code instructions for:
generating the updated known client device session in an instance in which the client device ID correlates to one of the any known client device sessions and a timestamp associated with the one of the any known client device sessions satisfies a predetermined threshold.

12. The computer program product according to claim 10, wherein the client device ID and client device profile data is compared to a latest known client device version, and
wherein an updated known client device version is generated in an instance in which the client device ID correlates to latest known client device version and the client device profile data does not correlate to the latest known client device version, and
a new known client device version is generated in an instance in which the client device ID does not correlate to latest known client device version.

13. The computer program product according to claim 10, wherein the client device ID is compared to a last known client device session, and
wherein an updated known client device session is generated in an instance in which the client device ID correlates to the last known client device session, and
a new known client device session is generated in an instance in which the client device ID does not correlate to last known client device session.

14. The computer program product according to claim 10, wherein the computer-executable program code instructions further comprise program code instructions for:
terminating the updated known client device session or the new known client device session; and
generating a consumer attached client device session upon receiving the consumer ID.

15. The computer program product according to claim 14, wherein the computer-executable program code instructions further comprise program code instructions for:
receiving a logout request;
terminating the consumer attached client device session; and
generating a consumer detached client device session.

16. The computer program product according to claim 10, wherein client device profile data comprises at least one of browser type, internet protocol (IP) address, or device model.

17. The computer program product according to claim 11, wherein the computer-executable program code instructions further comprise program code instructions for:
generating a new timestamp based on a current time for association with the updated known client device session.

18. The computer program product according to claim 10, wherein the computer-executable program code instructions further comprise program code instructions for:
receiving session specific data; and
associating the session specific data to the updated known client device session or the new known client device session.

19. An apparatus for monitoring and identifying mobile application and web browser activity of a client device, the apparatus comprising a processor and a memory having computer code stored therein, the computer code configured, when executed by the processor, to cause the apparatus to:

receive client device ID and client device profile data;
compare client device ID and client device profile data to a plurality of known client device versions, the known client device version being a data entity generated by a host system that identifies a particular instance of a client device;
generate an updated known client device version in an instance in which the client device ID correlates to at least one of the plurality of known client device versions and the client device profile data does not correlate to the at least one of the plurality of known client device versions;
generate a new known client device version in an instance in which the client device ID does not correlate to at least one of the plurality of known client device versions;
compare client device ID to any known client device sessions, a known client device session being a data entity generated by a host system that captures, identifies, or embodies an instance or a period of consumer activity associated with a website or mobile application, the comparing of the client device ID to any known client device sessions comprising:
determine when to close a session based on captured indications of consumer activity for the period of consumer activity; associating a session timestamp, which is a data entity that may be included in a session ID for indicating a time of last consumer activity, at each instance of consumer activity; and identifying, upon reception of an indication indicative of new consumer activity, whether a stop in consumer activity meets a predetermined threshold; based on the session timestamp, a session time being a predetermined time of inactivity in which the host system may determine that subsequent consumer activity is part of an originally identified session;
generate an updated known client device session in an instance in which the client device ID correlates to any known client device sessions;
generate a new known client device session in an instance in which the client device ID does not correlate to any known client device sessions;
receive a consumer ID; and
correlate the updated known client device session or the new known client device session to a consumer session reference based on the consumer ID.

20. The apparatus according to claim 19, wherein the computer code is further configured, when executed by the processor, to cause the apparatus to:
generate the updated known client device session in an instance in which the client device ID correlates to one of the any known client device sessions and a timestamp associated with the one of the any known client device sessions satisfies a predetermined threshold.

21. The apparatus according to claim 19, wherein the client device ID and client device profile data is compared to a latest known client device version, and
wherein an updated known client device version is generated in an instance in which the client device ID correlates to latest known client device version and the client device profile data does not correlate to the latest known client device version, and
a new known client device version is generated in an instance in which the client device ID does not correlate to latest known client device version.

22. The apparatus according to claim 19, wherein the client device ID is compared to a last known client device session, and
wherein an updated known client device session is generated in an instance in which the client device ID correlates to the last known client device session, and
a new known client device session is generated in an instance in which the client device ID does not correlate to last known client device session.

23. The apparatus according to claim 19, wherein the computer code is further configured, when executed by the processor, to cause the apparatus to:
terminate the updated known client device session or the new known client device session; and
generate a consumer attached client device session upon receiving the consumer ID.

24. The apparatus according to claim 23, wherein the computer code is further configured, when executed by the processor, to cause the apparatus to:
receive a logout request;
terminate the consumer attached client device session; and
generate a consumer detached client device session.

25. The apparatus according to claim 19, wherein client device profile data comprises at least one of browser type, internet protocol (IP) address, or device model.

26. The apparatus according to claim 20, wherein the computer-executable program code instructions further comprise program code instructions for:
generate a new timestamp based on a current time for association with the updated known client device session.

27. The apparatus according to claim 19, wherein the computer code is further configured, when executed by the processor, to cause the apparatus to:
receive session specific data; and
associate the session specific data to the updated known client device session or the new known client device session.

* * * * *